US011127148B1

(12) United States Patent
Edmonds et al.

(10) Patent No.: US 11,127,148 B1
(45) Date of Patent: Sep. 21, 2021

(54) PARALLAX CORRECTION FOR PARTIALLY OVERLAPPING STEREO DEPTH IMAGES

(71) Applicant: MICROSOFT TECHNOLOGY LICENSING, LLC, Redmond, WA (US)

(72) Inventors: Christopher Douglas Edmonds, Carnation, WA (US); Michael Bleyer, Seattle, WA (US); Raymond Kirk Price, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/872,717

(22) Filed: May 12, 2020

(51) Int. Cl.
*G06T 7/593* (2017.01)
*G06T 15/00* (2011.01)
*H04N 13/128* (2018.01)

(52) U.S. Cl.
CPC ............ *G06T 7/593* (2017.01); *G06T 15/005* (2013.01); *H04N 13/128* (2018.05); *G06T 2207/10028* (2013.01); *G06T 2207/20081* (2013.01)

(58) Field of Classification Search
CPC .................. G06T 7/593; G06T 15/005; G06T 2207/10028; G06T 2207/20081; H04N 13/128
See application file for complete search history.

(56) References Cited

U.S. PATENT DOCUMENTS

| | | | | |
|---|---|---|---|---|
| 6,078,427 | A * | 6/2000 | Fontaine | G02B 27/0093 345/7 |
| 2011/0221869 | A1* | 9/2011 | Yamaya | H04N 13/296 348/47 |
| 2015/0002507 | A1* | 1/2015 | Ambrus | G06T 19/00 345/419 |
| 2016/0088287 | A1* | 3/2016 | Sadi | H04N 13/271 348/43 |
| 2017/0270715 | A1* | 9/2017 | Lindsay | G06T 7/70 |
| 2019/0392211 | A1* | 12/2019 | Hartman | G06K 9/00671 |
| 2019/0394441 | A1* | 12/2019 | Simek | H04N 5/265 |
| 2020/0134848 | A1* | 4/2020 | El-Khamy | H04N 5/2258 |
| 2020/0342673 | A1* | 10/2020 | Lohr | G02B 27/0172 |
| 2021/0026443 | A1* | 1/2021 | Akman | G06F 3/012 |

* cited by examiner

*Primary Examiner* — Maurice L. McDowell, Jr.
(74) *Attorney, Agent, or Firm* — Workman Nydegger

(57) ABSTRACT

Improved techniques for generating a depth map are disclosed herein. Initially, a stereo pair of images comprising a first and second image are obtained. Both an overlap region and a non-overlap region are identified as between these two images. A depth map is generated based on the stereo pair of images. Generating this depth map is performed by determining, for the overlap region, depths for a portion of an environment represented by the overlap region via stereo matching. The generation process is also performed by determining, for the non-overlap region, depths for a portion of the environment represented by the non-overlap region by acquiring depth information from a source different from the stereo pair of images.

18 Claims, 22 Drawing Sheets

Merge 1500
Full Depth Map 1520
Alignment 1525
Pose 1530
Depth Information 1505
Depth Information 1510
Depth Information 1515
Depth Match From Stereo Matching Alone 1535

Surface Reconstruction Mesh
900

PARALLAX CORRECTION FOR PARTIALLY OVERLAPPING STEREO DEPTH IMAGES

BACKGROUND

Mixed-reality (MR) systems, including virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

Many MR systems include a depth detection system (e.g., time of flight camera, rangefinder, stereoscopic depth cameras, etc.). A depth detection system provides depth information about the real-world environment surrounding the MR system to enable the MR system to accurately present MR content (e.g., holograms) with respect to real-world objects or other virtual objects. As an illustrative example, a depth detection system is able to obtain depth information for a real-world table positioned within a real-world environment. The MR system is then able to render and display a virtual figurine accurately positioned on the real-world table such that the user perceives the virtual figurine as though it were part of the user's real-world environment.

A MR system may also employ cameras of a depth detection system, such as stereo cameras, for other purposes. For example, a MR system may utilize images obtained by stereo cameras to provide a passthrough view of the user's environment to the user. A passthrough view can aid users in avoiding disorientation and/or safety hazards when transitioning into and/or navigating within a MR environment.

Furthermore, in some instances, a MR system includes stereo cameras of various modalities to provide views of a user's environment that enhance the user's understanding of his/her real-world environment. For example, a MR system that includes long wavelength thermal imaging cameras may allow a user (e.g., a first responder) to see through smoke, haze, fog, and/or dust. In another example, a MR system that includes low light imaging cameras may allow a user (e.g., a first responder) to see in dark environments.

A MR system can present views captured by stereo cameras to users in a variety of ways. The process of using images captured by world-facing cameras to provide three-dimensional views of a real-world environment to a user creates many challenges, however.

Some of these challenges occur as a result of the stereo cameras being physically separated from the physical positioning of the user's eyes. If the camera's images were directly provided to the user as passthrough images, those images would cause the user to perceive the real-world environment from the camera's perspective as opposed to the user's own perspective. For example, a vertical offset between the positioning of the user's eyes and the positioning of the stereo cameras can cause the user to perceive real-world objects as vertically offset from their true positions with respect to the user. In another example, a difference in the spacing between the user's eyes and the spacing between the stereo cameras can cause the user to perceive real-world objects with incorrect depth.

The difference in perception between how the cameras observe an object and how a user's eyes observe an object is often referred to as the "parallax problem" or "parallax error." FIG. 1 illustrates a conceptual representation of the parallax problem 100 in which cameras 105A and 105B (i.e. a stereo pair of camera) are physically separated from a user's eyes 110A and 1108. Sensor region 115A conceptually depicts the image sensing regions of camera 105A (e.g., the pixel grid) and the user's eye 110A (e.g., the retina). Similarly, sensor region 115B conceptually depicts the image sensing regions of camera 105B and the user's eye 1108.

The cameras 105A and 105B and the user's eyes 110A and 1108 perceive an object 120, as indicated in FIG. 1 by the lines extending from the object 120 to the cameras 105A and 105B and the user's eyes 110A and 1108, respectively. FIG. 1, for example, illustrates that the cameras 105A and 105B perceive the object 120 at different positions on their respective sensor regions 115A and 115B. Similarly, FIG. 1 shows that the user's eyes 110A and 1108 perceive the object 120 at different positions on their respective sensor regions 115A and 115B. Furthermore, the user's eye 110A perceives the object 120 at a different position on sensor region 115A than camera 105A, and the user's eye 110B perceives the object 120 at a different position on sensor region 115B than camera 105B.

Some approaches to correct for the parallax problem involve performing a camera reprojection from the perspective of the stereo cameras to the perspectives of the user's eyes. For instance, some approaches involve performing a calibration step to determine the differences in physical positioning between the stereo cameras and the user's eyes. Then, after capturing a timestamped pair of stereo images with the stereo cameras, a step of calculating depth information (e.g., a depth map) based on the stereo pair of images can be performed (e.g., by performing stereo matching). Subsequently, a system can reproject the stereo images using the calculated depth information so that perspectives embodied within those stereo images correspond to the perspectives of the user's left and right eyes.

However, calculating and processing depth information based on a stereo pair of images, particularly when addressing the parallax problem, is associated with many challenges. For instance, one characteristic of stereo images is that only a portion of the two images overlap with one another. Stereo depth matching relies on this overlapping region to identify disparities between common pixels that exist between the two images. The disparity can then be used to determine the depth for that pixel and include that depth in a depth map. Notably, however, stereo depth matching cannot be used for non-overlapping regions that exist in the two stereo images. When parallax correction is performed using the depth map that was created based on stereo depth matching, the entirety of the parallax-corrected images may not truly reflect the correct perspective because the non-overlapping regions for those images may not have been correctly reprojected (e.g., because the depth map would not have included depth information for those non-overlapping regions). As a consequence, there is a substantial need to improve how depth maps are created to improve parallax correction operations, especially for non-overlapping regions existing in stereo images. Accordingly, for at least the foregoing reasons, there is an ongoing need and desire for improved techniques and systems for calculating and processing depth information, particularly for systems that resolve parallax problems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., wearable devices, storage devices, etc.), and methods for facilitating improvements in how depth maps are generated.

In some embodiments, a stereo pair of images of an environment is obtained. This stereo pair includes both a first image and a second image. An overlap region is also identified as between the first and second images. Here, the overlap region is a region where a field of view (FOV) of the first image partially overlaps a FOV of the second image. Additionally, a non-overlap region is identified for the first image. This non-overlap region is a region in the first image where the FOV of the second image does not overlap the FOV of the first image. A depth map is generated based on the stereo pair of images. This generation process includes determining, for the overlap region, depths for a portion of the environment represented by the overlap region by performing stereo matching using the overlap region. The generation process also includes determining, for the non-overlap region, depths fora portion of the environment represented by the non-overlap region by acquiring depth information from a source different from the stereo pair of images.

In addition to the above operations, some embodiments identify a second non-overlap region for the second image. The second non-overlap region is a region in the second image where the FOV of the first image does not overlap the FOV of the second image. Additionally, in some embodiments, the depth map generation process includes determining, for the second non-overlap region, depths for a portion of the environment represented by the second non-overlap region by acquiring depth information from the same source, which is different from the stereo pair of images.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
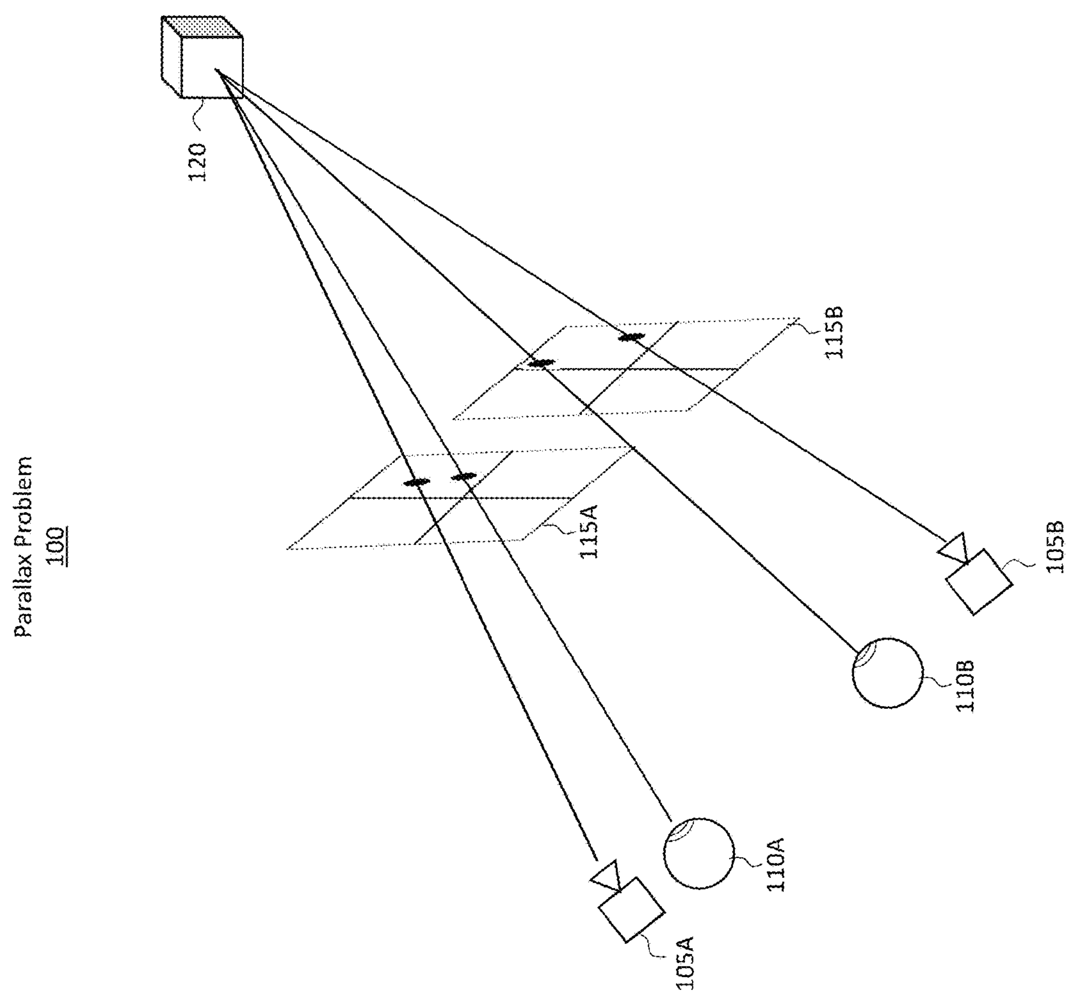
FIG. 1 illustrates an example of the parallax problem that occurs when cameras have fields of view different than the fields of view of a user's eyes.

Embodiments disclosed herein relate to systems, devices (e.g., wearable devices, hardware storage devices, and others), and methods for facilitating improvements in how depth maps are generated.

In some embodiments, a stereo pair of images of an environment is obtained. An overlap region is identified as between a first one and a second one of the stereo images.

The overlap region is a region where the first image's FOV partially overlaps the second image's FOV. Additionally, a non-overlap region is identified for the first image. This non-overlap region is a region in the first image where the second image's FOV does not overlap the first image's FOV. A depth map is generated based on the stereo pair of images. Such a process includes determining depths for a portion of the environment represented by the overlap region by performing stereo matching using the overlap region. The process also includes determining depths for a portion of the environment represented by the non-overlap region by acquiring depth information from a source different from the stereo pair of images.

In addition to the above operations, some embodiments identify a second non-overlap region for the second image. The second non-overlap region is a region in the second image where the first image's FOV does not overlap the second image's FOV. Additionally, in some embodiments, the depth map generation process includes determining depths for a portion of the environment represented by the second non-overlap region by acquiring depth information from the same source, which is different from the stereo pair of images.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments provide substantial benefits to the technical field. For instance, the disclosed embodiments improve how depth maps are generated, which depth maps are then used for parallax correction. As a result, both the depth map generation process is improved and the parallax correction process is improved.

Specifically, depth maps are often generated using a stereo pair of images, where those images at least partially overlap one another. Disparities between common pixels (located in the overlapping region) could then be used to determine depth. Traditional depth maps, however, failed to account for the "non-overlapping" regions of those images. That is, the pixels in a non-overlapping region of a first image do not have a corresponding pixel in the second image, thus stereo matching could not be performed for those pixels and depths for those pixels would not be included in the resulting depth map. Because those pixels did not have depth values, the parallax correction was not properly performed for those pixels, resulting in a less accurate and robust parallax-corrected images.

The disclosed embodiments, on the other hand, are able to provide depths for these non-overlapping regions. Doing so results in a more complete depth map and also results in more accurate and robust parallax-corrected images. Providing these improved parallax-corrected images to the user enables the user to have an enhanced experience with the computer system. Accordingly, substantial benefits are realized through the practice of the disclosed principles

Example MR Systems and HMDs

Figure 2:
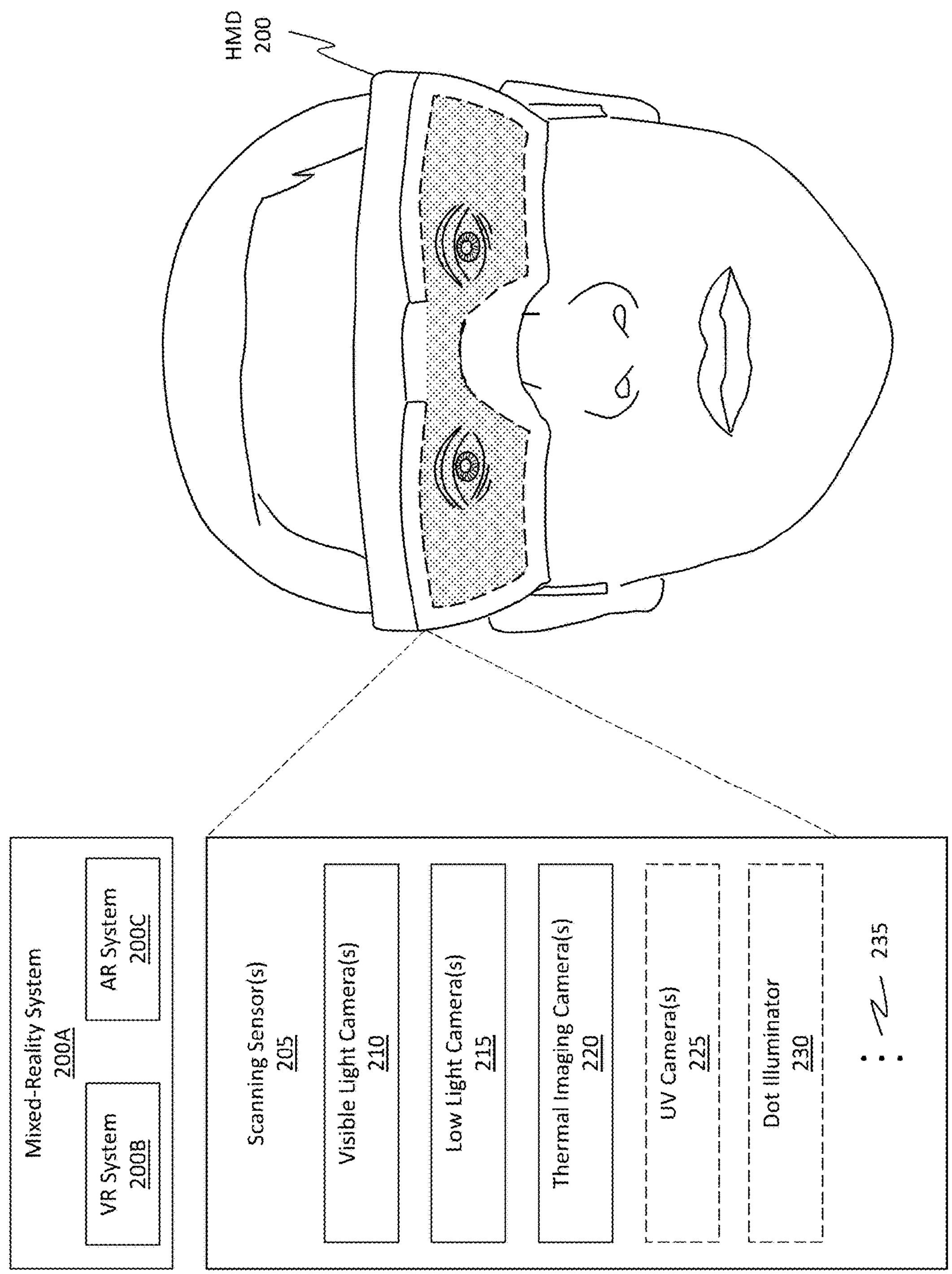
FIG. 2 illustrates an example HMD that may be used to perform one or more of the disclosed operations.

Attention will now be directed to FIG. 2, which illustrates an example of a head-mounted device (HMD) 200. HMD 200 can be any type of MR system 200A, including a VR system 200B or an AR system 200C. It should be noted that while a substantial portion of this disclosure is focused on the use of an HMD, the embodiments are not limited to being practiced using only an HMD. That is, any type of scanning system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

HMD 200 is shown as including scanning sensor(s) 205 (i.e. a type of scanning or camera system), and HMD 200 can use the scanning sensor(s) 205 to scan environments, map environments, capture environmental data, and/or generate any kind of images of the environment (e.g., by generating a 3D representation of the environment or by generating a "passthrough" visualization). Scanning sensor(s) 205 may comprise any number or any type of scanning devices, without limit.

In accordance with the disclosed embodiments, the HMD 200 may be used to generate a parallax-corrected passthrough visualization of the user's environment. As described earlier, a "passthrough" visualization refers to a visualization that reflects what the user would see if the user were not wearing the HMD 200, regardless of whether the HMD 200 is included as a part of an AR system or a VR system. To generate this passthrough visualization, the HMD 200 may use its scanning sensor(s) 205 to scan, map, or otherwise record its surrounding environment, including any objects in the environment, and to pass that data on to the user to view. In many cases, the passed-through data is modified to reflect or to correspond to a perspective of the user's pupils. The perspective may be determined by any type of eye tracking technique.

To convert a raw image into a passthrough image, the scanning sensor(s) 205 typically rely on its cameras (e.g., head tracking cameras, hand tracking cameras, depth cameras, or any other type of camera) to obtain one or more raw images (aka texture images) of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections.

As used herein, a "depth map" details the positional relationship and depths relative to objects in the environment. Consequently, the positional arrangement, location, geometries, contours, and depths of objects relative to one another can be determined. From the depth maps, a 3D representation of the environment can be generated.

Relatedly, from the passthrough visualizations, a user will be able to perceive what is currently in his/her environment without having to remove or reposition the HMD 200. Furthermore, as will be described in more detail later, the disclosed passthrough visualizations will also enhance the user's ability to view objects within his/her environment (e.g., by displaying additional environmental conditions that may not have been detectable by a human eye).

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 205 include visible light camera(s) 210, low light camera(s) 215, thermal imaging camera(s) 220, potentially (though not necessarily, as represented by the dotted box in FIG. 2) ultraviolet (UV) cameras 225, and potentially (though not necessarily, as represented by the dotted box) a dot illuminator 230. The ellipsis 235 demonstrates how any other type of camera or camera system (e.g., depth cameras, time of flight cameras, virtual cameras, depth lasers, etc.) may be included among the scanning sensor(s) 205. As an example, a camera structured to detect mid-infrared wavelengths may be included within the scanning sensor(s) 205. As another example, any number of virtual cameras that are reprojected from an actual camera may be included among the scanning sensor(s) 205 and may be used to generate a stereo pair of images. In this manner and as will be discussed in more detail later, the scanning sensor(s) 205 may be used to generate the stereo pair of images. In some cases, the stereo pair of images may be obtained or generated as a result of performing any one or more of the following operations: active stereo image generation via use of two cameras and one dot illuminator (e.g., dot illuminator 230); passive stereo image generation via use of two cameras; image generation using structured light via use of one actual camera, one virtual camera, and one dot illuminator (e.g., dot illuminator 230); or image generation using a time of flight (TOF) sensor in which a baseline is present between a depth laser and a corresponding camera and in which a field of view (FOV) of the corresponding camera is offset relative to a field of illumination of the depth laser.

Generally, a human eye is able to perceive light within the so-called "visible spectrum," which includes light (or rather, electromagnetic radiation) having wavelengths ranging from about 380 nanometers (nm) up to about 740 nm. As used herein, the visible light camera(s) 210 include two or more red, green, blue (RGB) cameras structured to capture light photons within the visible spectrum. Often, these RGB cameras are complementary metal-oxide-semiconductor (CMOS) type cameras, though other camera types may be used as well (e.g., charge coupled devices, CCD).

The RGB cameras are typically stereoscopic cameras, meaning that the fields of view of the two or more RGB cameras at least partially overlap with one another. With this overlapping region, images generated by the visible light camera(s) 210 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 210 can be used to not only generate passthrough visualizations, but they can also be used to determine object depth. In some embodiments, the visible light camera(s) 210 can capture both visible light and IR light.

The low light camera(s) 215 are structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 30,000 nm). Mid-IR has energy values in between or in the middle of the near-IR and far-IR ranges. The low light camera(s) 215 are structured to detect or be sensitive to IR light in at least the near-IR range.

In some embodiments, the visible light camera(s) 210 and the low light camera(s) 215 (aka low light night vision cameras) operate in approximately the same overlapping wavelength range. In some cases, this overlapping wavelength range is between about 400 nanometers and about 1,000 nanometers. Additionally, in some embodiments these two types of cameras are both silicon detectors.

One distinguishing feature between these two types of cameras is related to the illuminance conditions or illuminance range(s) in which they actively operate. In some cases, the visible light camera(s) 210 are low power cameras and operate in environments where the illuminance is between about 10 lux and about 100,000 lux, or rather, the illuminance range begins at about 10 lux and increases beyond 10 lux. In contrast, the low light camera(s) 215 consume more power and operate in environments where the illuminance range is between about 1 milli-lux and about 10 lux.

The thermal imaging camera(s) 220, on the other hand, are structured to detect electromagnetic radiation or IR light in the far-IR (i.e. thermal-IR) range, though some embodiments also enable the thermal imaging camera(s) 220 to detect radiation in the mid-IR range. To clarify, the thermal imaging camera(s) 220 may be a long wave infrared imaging camera structured to detect electromagnetic radiation by measuring long wave infrared wavelengths. Often, the thermal imaging camera(s) 220 detect IR radiation having wavelengths between about 8 microns and 14 microns. Because the thermal imaging camera(s) 220 detect far-IR radiation, the thermal imaging camera(s) 220 can operate in any illuminance condition, without restriction.

In some cases (though not all), the thermal imaging camera(s) 220 include an uncooled thermal imaging sensor. An uncooled thermal imaging sensor uses a specific type of detector design that is based on a bolometer, which is a device that measures the magnitude or power of an incident electromagnetic wave/radiation. To measure the radiation, the bolometer uses a thin layer of absorptive material (e.g., metal) connected to a thermal reservoir through a thermal link. The incident wave strikes and heats the material. In response to the material being heated, the bolometer detects a temperature-dependent electrical resistance. Changes to environmental temperature cause changes to the bolometer's temperature, and these changes can be converted into an electrical signal to thereby produce a thermal image of the environment. In accordance with at least some of the disclosed embodiments, the uncooled thermal imaging sensor is used to generate any number of thermal images. The bolometer of the uncooled thermal imaging sensor can detect electromagnetic radiation across a wide spectrum, spanning the mid-IR spectrum, the far-IR spectrum, and even up to millimeter-sized waves.

The UV camera(s) 225 are structured to capture light in the UV range. The UV range includes electromagnetic radiation having wavelengths between about 10 nm and about 400 nm. The disclosed UV camera(s) 225 should be interpreted broadly and may be operated in a manner that includes both reflected UV photography and UV induced fluorescence photography.

Accordingly, as used herein, reference to "visible light cameras" (including "head tracking cameras"), are cameras that are primarily used for computer vision to perform head tracking. These cameras can detect visible light, or even a combination of visible and IR light (e.g., a range of IR light, including IR light having a wavelength of about 850 nm). In some cases, these cameras are global shutter devices with pixels being about 3 μm in size. Low light cameras, on the other hand, are cameras that are sensitive to visible light and near-IR. These cameras are larger and may have pixels that are about 8 μm in size or larger. These cameras are also sensitive to wavelengths that silicon sensors are sensitive to, which wavelengths are between about 350 nm to 1100 nm. Thermal/long wavelength IR devices (i.e. thermal imaging cameras) have pixel sizes that are about 10 μm or larger and detect heat radiated from the environment. These cameras are sensitive to wavelengths in the 8 μm to 14 μm range. Some embodiments also include mid-IR cameras configured to detect at least mid-IR light. These cameras often comprise non-silicon materials (e.g., InP or InGaAs) that detect light in the 800 nm to 2 μm wavelength range.

Accordingly, the disclosed embodiments may be structured to utilize numerous different camera types. The different camera types include, but are not limited to, visible light cameras, low light cameras, thermal imaging cameras, and UV cameras. Stereo depth matching may be performed using images generated from any one type or combination of types of the above listed camera types.

Generally, the low light camera(s) 215, the thermal imaging camera(s) 220, and the UV camera(s) 225 (if present) consume relatively more power than the visible light camera(s) 210. Therefore, when not in use, the low light camera(s) 215, the thermal imaging camera(s) 220, and the UV camera(s) 225 are typically in the powered-down state in which those cameras are either turned off (and thus consuming no power) or in a reduced operability mode (and thus consuming substantially less power than if those cameras were fully operational). In contrast, the visible light camera(s) 210 are typically in the powered-up state in which those cameras are by default fully operational.

It should be noted that any number of cameras may be provided on the HMD 200 for each of the different camera types. That is, the visible light camera(s) 210 may include 1, 2, 3, 4, 5, 6, 7, 8, 9, 10, or more than 10 cameras. Often, however, the number of cameras is at least 2 so the HMD 200 can perform stereoscopic depth matching, as described earlier. Similarly, the low light camera(s) 215, the thermal imaging camera(s) 220, and the UV camera(s) 225 may each respectively include 1, 2, 3, 4, 5, 6, 7, 8, 9, 10, or more than 10 corresponding cameras.

Figure 3:
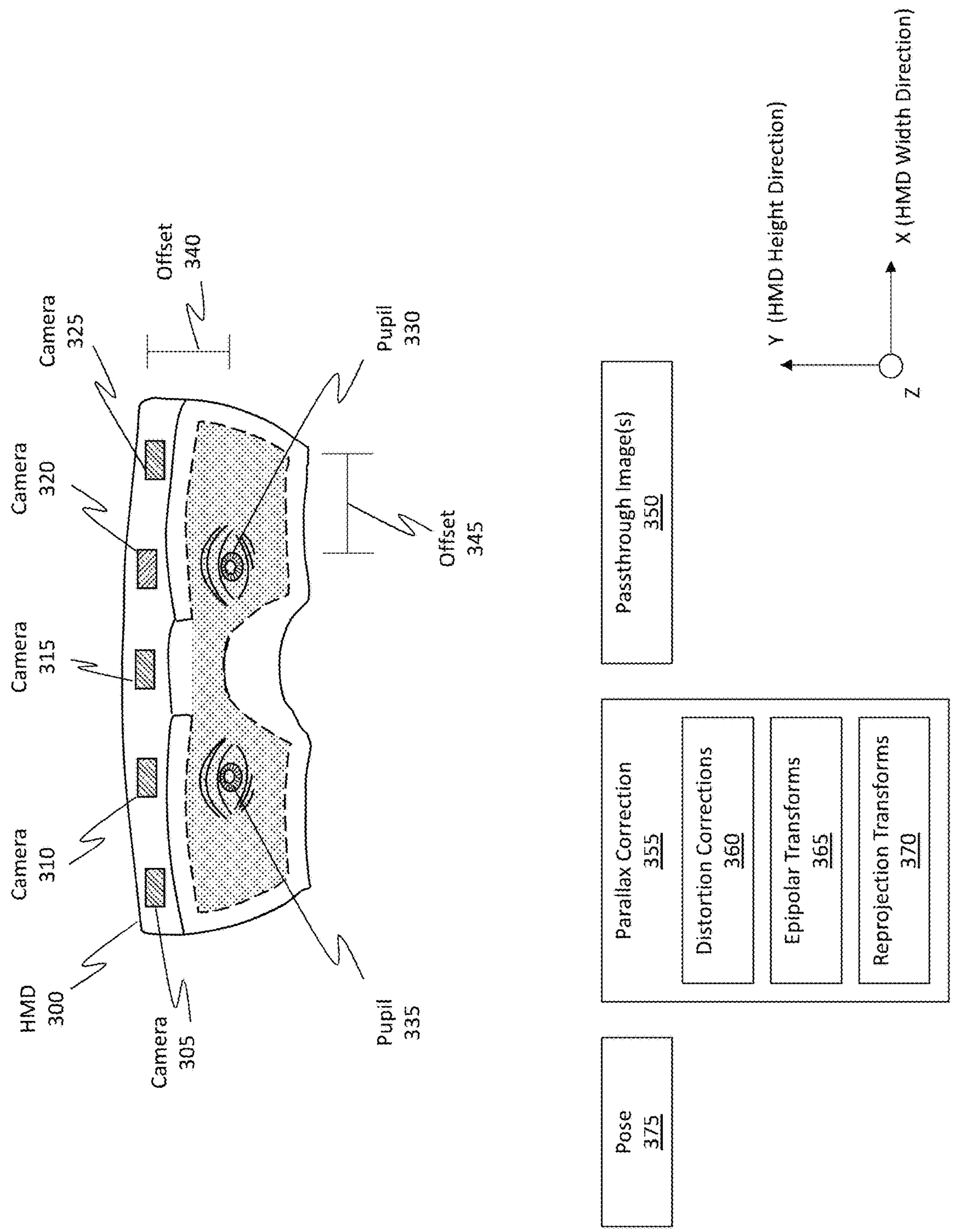
FIG. 3 illustrates various structural configurations of an example HMD as well as a parallax correction operation.

FIG. 3 illustrates an example HMD 300, which is representative of the HMD 200 from FIG. 2. HMD 300 is shown as including multiple different cameras, including cameras 305, 310, 315, 320, and 325. Cameras 305-325 are representative of any number or combination of the visible light camera(s) 210, the low light camera(s) 215, the thermal imaging camera(s) 220, and the UV camera(s) 225 from FIG. 2. While only 5 cameras are illustrated in FIG. 3, HMD 300 may include more or less than 5 cameras.

In some cases, the cameras can be located at specific positions on the HMD 300. For instance, in some cases a first camera (e.g., perhaps camera 320) is disposed on the HMD 300 at a position above a designated left eye position of any users who wear the HMD 300 relative to a height direction of the HMD. For instance, the camera 320 is positioned above the pupil 330. As another example, the first camera (e.g., camera 320) is additionally positioned above the designated left eye position relative to a width direction of the HMD. That is, the camera 320 is positioned not only above the pupil 330 but also in-line relative to the pupil 330. When a VR system is used, a camera may be placed directly in front of the designated left eye position. For example, with reference to FIG. 3, a camera may be physically disposed on the HMD 300 at a position in front of the pupil 330 in the z-axis direction.

When a second camera is provided (e.g., perhaps camera 310), the second camera may be disposed on the HMD at a position above a designated right eye position of any users who wear the HMD relative to the height direction of the HMD. For instance, the camera 310 is above the pupil 335. In some cases, the second camera is additionally positioned above the designated right eye position relative to the width direction of the HMD. When a VR system is used, a camera may be placed directly in front of the designated right eye position. For example, with reference to FIG. 3, a camera may be physically disposed on the HMD 300 at a position in front of the pupil 335 in the z-axis direction.

When a user wears HMD 300, HMD 300 fits over the user's head and the HMD 300's display is positioned in front of the user's pupils, such as pupil 330 and pupil 335. Often, the cameras 305-325 will be physically offset some distance from the user's pupils 330 and 335. For instance, there may be a vertical offset in the HMD height direction (i.e. the "Y" axis), as shown by offset 340. Similarly, there may be a horizontal offset in the HMD width direction (i.e. the "X" axis), as shown by offset 345.

As described earlier, HMD 300 is configured to provide passthrough image(s) 350 for the user of HMD 300 to view. In doing so, HMD 300 is able to provide a visualization of the real world without requiring the user to remove or reposition HMD 300. These passthrough image(s) 350 effectively represent the same view the user would see if the user were not wearing HMD 300. Cameras 305-325 are used to provide these passthrough image(s) 350.

None of the cameras 305-325, however, are directly aligned with the pupils 330 and 335. The offsets 340 and 345 actually introduce differences in perspective as between the cameras 305-325 and the pupils 330 and 335. These perspective differences are referred to as "parallax."

Because of the parallax occurring as a result of the offsets 340 and 345, raw images (aka texture images) produced by the cameras 305-325 are not available for immediate use as passthrough image(s) 350. Instead, it is beneficial to perform a parallax correction 355 (aka an image synthesis) on the raw images to transform the perspectives embodied within those raw images to correspond to perspectives of the user's pupils 330 and 335. The parallax correction 355 includes any number of distortion corrections 360 (e.g., to correct for concave or convex wide or narrow angled camera lenses), epipolar transforms 365 (e.g., to parallelize the optical axes of the cameras), and/or reprojection transforms 370 (e.g., to reposition the optical axes so as to be essentially in front of or in-line with the user's pupils). The parallax correction 355 includes performing depth computations to determine the depth of the environment and then reprojecting images to a determined location or as having a determined perspective. As used herein, the phrases "parallax correction" and "image synthesis" may be interchanged with one another and may include performing stereo passthrough parallax correction and/or image reprojection parallax correction.

The reprojections are based on a current pose 375 of the HMD 300 relative to its surrounding environment. Based on the pose 375 and the depth maps that are generated, the embodiments are able to correct parallax by reprojecting a perspective embodied by the raw images to coincide with a perspective of the user's pupils 330 and 335.

The embodiments perform three-dimensional (3D) geometric transforms on the raw camera images to transform the perspectives of the raw images in a manner so as to correlate with the perspectives of the user's pupils 330 and 335. Additionally, the 3D geometric transforms rely on depth computations in which the objects in the HMD 300's environment are mapped out to determine their depths as well as the pose 375. Based on these depth computations and pose 375, the embodiments are able to three-dimensionally reproject or three-dimensionally warp the raw images in such a way so as to preserve the appearance of object depth in the passthrough image(s) 350, where the preserved object depth substantially matches, corresponds, or visualizes the actual depths of objects in the real world. Accordingly, the degree or amount of the parallax correction 355 is at least partially dependent on the degree or amount of the offsets 340 and 345.

By performing the parallax correction 355, the embodiments effectively create "virtual" cameras having positions that are in front of the user's pupils 330 and 335. By way of additional clarification, consider the position of camera 305, which is currently above and to the left of the pupil 335. By performing the parallax correction 355, the embodiments programmatically transform images generated by camera 305, or rather the perspectives of those images, so the perspectives appear as though camera 305 were actually positioned immediately in front of pupil 335. That is, even though camera 305 does not actually move, the embodiments are able to transform images generated by camera 305 so those images have the appearance as if camera 305 were positioned in front of pupil 335.

Stereo Depth Matching

Figure 4:
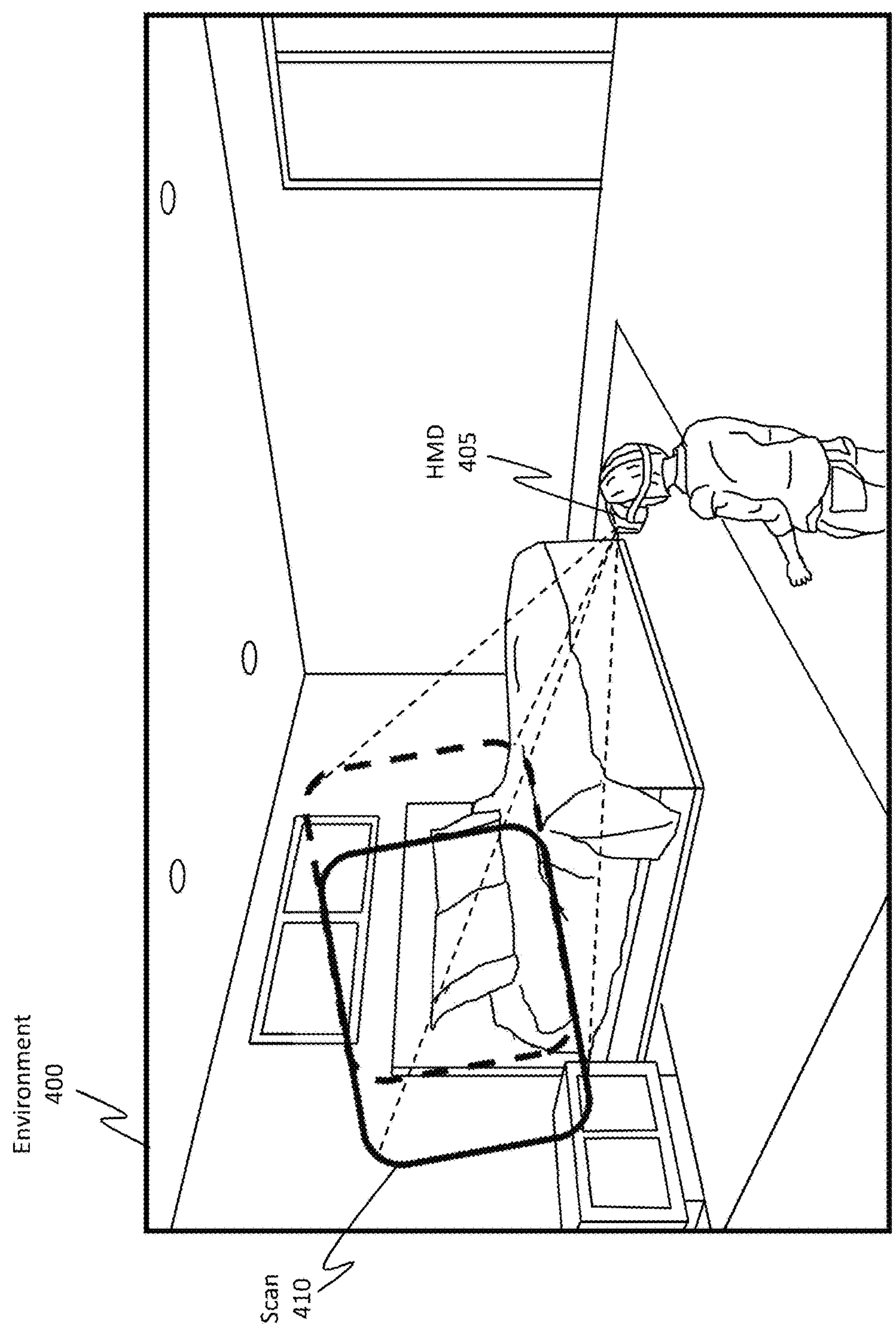
FIG. 4 illustrates an example process of scanning an environment using a stereo camera pair to obtain stereo images of the environment.

FIG. 4 shows an example environment 400 in which an HMD 405, which is representative of the HMDs discussed thus far, is operating. Here, the HMD 405 is performing a scan 410 of the environment 400 in an effort to identify depths of the objects included therein, as described earlier. Determining the depths can be performed using stereo depth matching, which is based on the disparity between common pixels that exist between two different stereo images.

Figure 5:
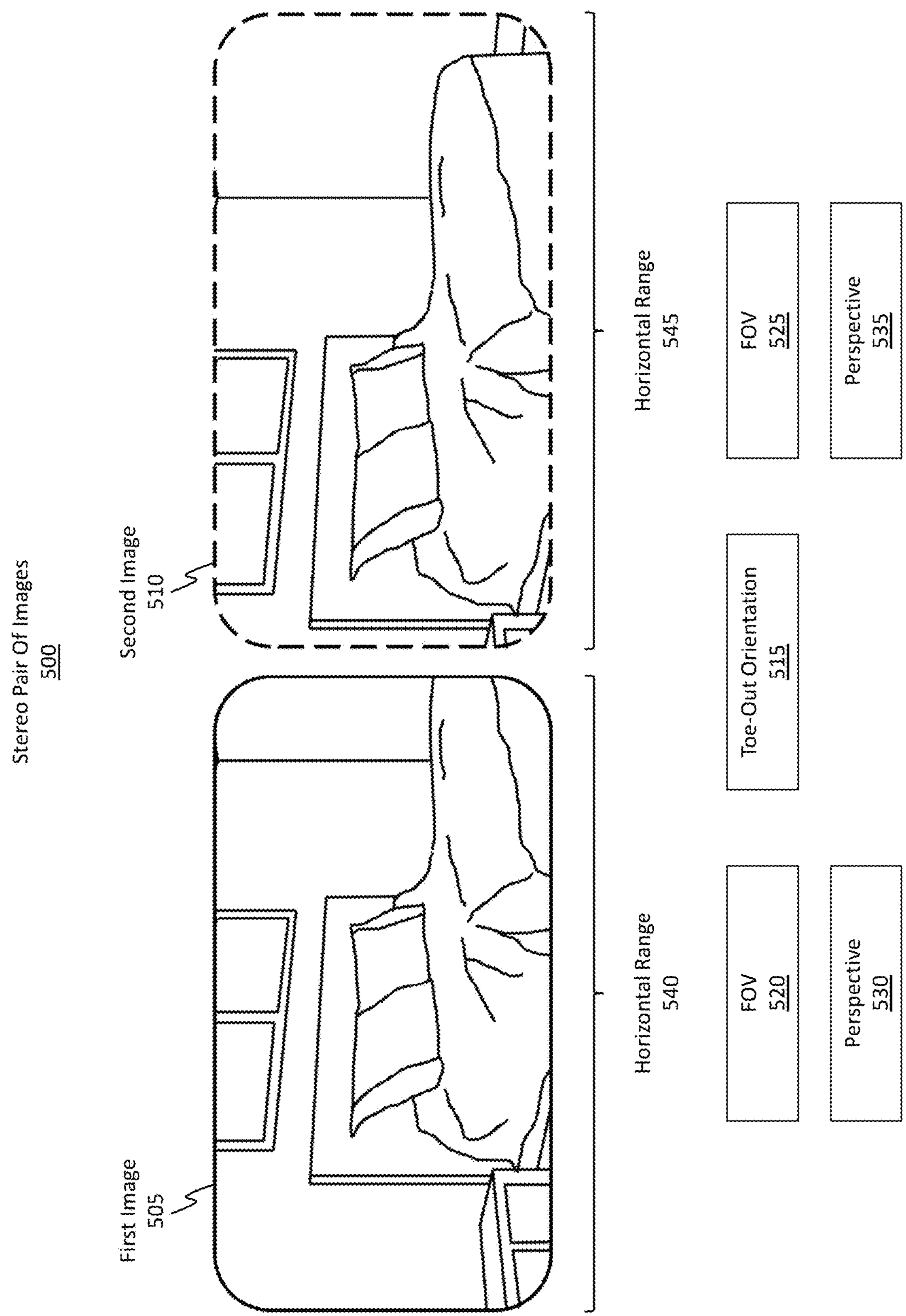
FIG. 5 illustrates an example of a stereo pair of images.

FIG. 5 shows a stereo pair of images 500, which includes a first image 505 and a second image 510. The stereo pair of images 500 may have been generated using any of the cameras discussed earlier. By way of example, the first image 505 is generated by a first camera and the second image 510 is generated by a second camera. The first camera is one camera selected from a group of cameras comprising a visible light camera, a low light camera, or a thermal imaging camera. Similarly, the second camera is also one camera selected from the group of cameras. In some cases, the first and second camera are the same while in other cases they are different.

Because those cameras have a physical toe-out orientation 515 relative to one another (i.e. their optical axes are angled relative to one another), the FOVs of the resulting images only partially overlap one another. For instance, the FOV 520 of the first image 505 only partially overlaps the FOV 525 of the second image 510. Additionally, because the cameras are positioned at different locations on the HMD, the perspective 530 of the environment, as captured by the first image 505, is different from the perspective 535 of the environment, as captured by the second image 510.

FIG. 5 also shows how the first image 505 has a horizontal range 540 and how the second image 510 has a horizontal range 545. In some embodiments, the horizontal ranges 540 and 545 are the same because similar cameras (e.g., two visible light cameras or two low light cameras, etc.) are used to capture the images. In some embodiments, the horizontal ranges 540 and 545 are different because different cameras (e.g., a visible light camera and a low light or thermal camera, etc.) are used. Generally, the horizontal ranges 540 and 545 span a range comprising between about a 50-degree horizontal sweep and a 75-degree horizontal sweep. In some embodiments the horizontal ranges 540 and 545 span about a 65-degree horizontal sweep. In some embodiments, the FOV of an image (i.e. the horizontal range) comprises at least a 60-degree horizontal range or sweep. Additionally, in some embodiments, the vertical ranges span a range comprising between about a 30-degree vertical sweep and a 50-degree vertical sweep. In some cases, the vertical range is about 40-degrees.

Figure 6:
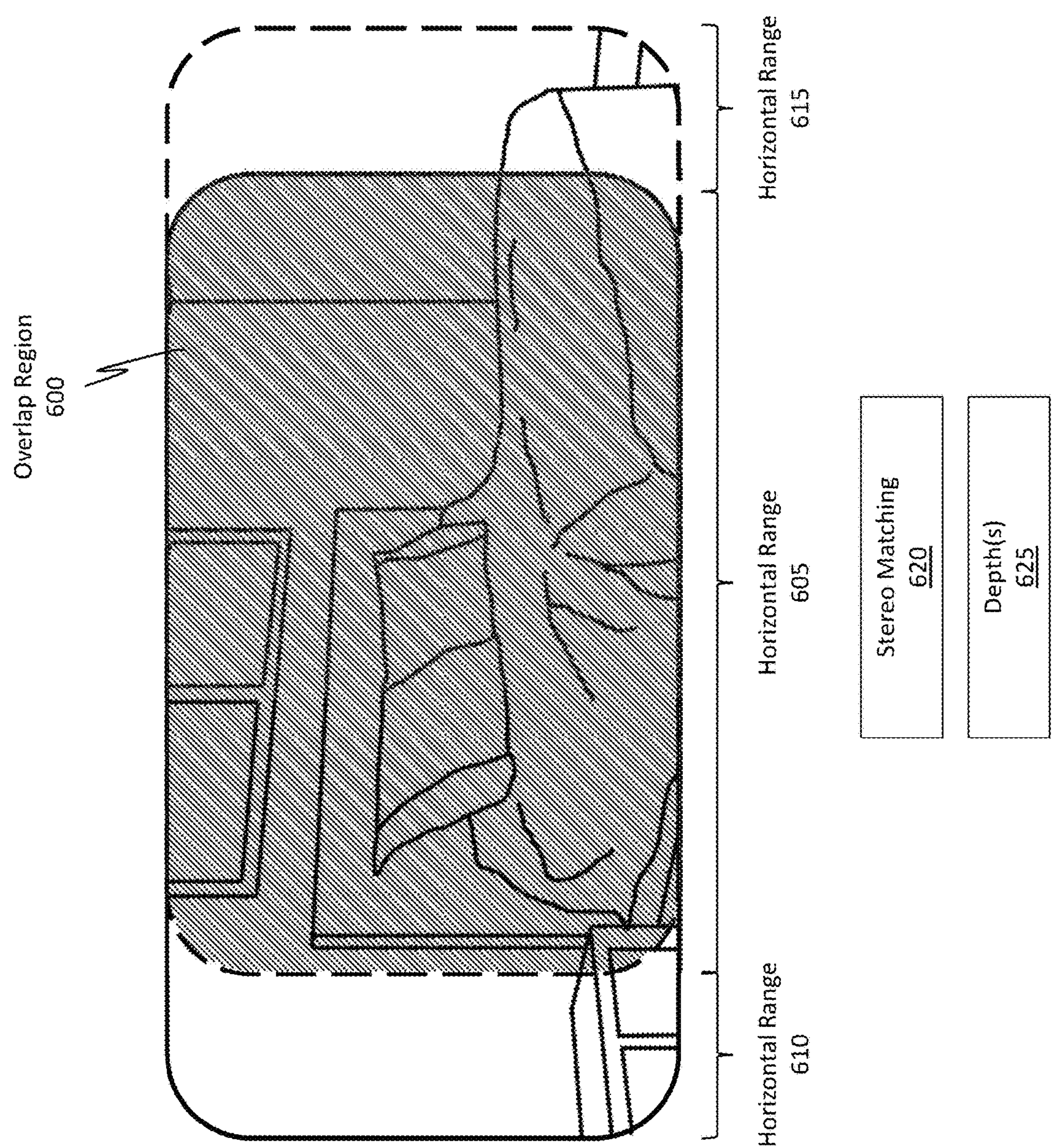
FIG. 6 illustrates how at least a portion of the two images included in the stereo pair overlap with one another.

FIG. 6 provides additional clarification on how the FOVs 520 and 525 from FIG. 5 at least partially overlap. Specifically, FIG. 6 shows a merged version of the first image 505 and the second image 510. FIG. 6 also shows an overlap region 600 where pixels from the first image 505 are common with pixels from the second image 510. That is, those pixels represent the same area of the environment such that the area is captured from two different perspectives. In some embodiments, the overlap region 600 as between the two images has a horizontal range 605 spanning between about 40-degrees to 60-degrees. In some embodiments, the horizontal range 605 is about 50-degrees. The remaining horizontal ranges 610 and 615 are often around 7.5-degrees each (or 15-degree cumulative), though these ranges can vary as well depending on the previous ranges described above. For instance, in some embodiments, the horizontal ranges 610 and 615 (which correspond to a so-called "non-overlap region" as will be discussed shortly) comprise at least a 10-degree horizontal range of the FOV of a particular image.

By identifying common pixels between the two images, which common pixels will lie within the overlap region 600, the embodiments are able to perform stereo matching 620 (aka stereo depth matching or stereoscopic depth matching) by identifying the coordinates for those common pixels and then identifying the disparity that exists between the coordinates. This disparity enables the stereo depth matching algorithm to determine depth(s) 625 for the pixels (or rather the objects) in the images residing in the overlap region 600. The depths can then be included in a depth map, which may be used to correct parallax.

Figure 7:
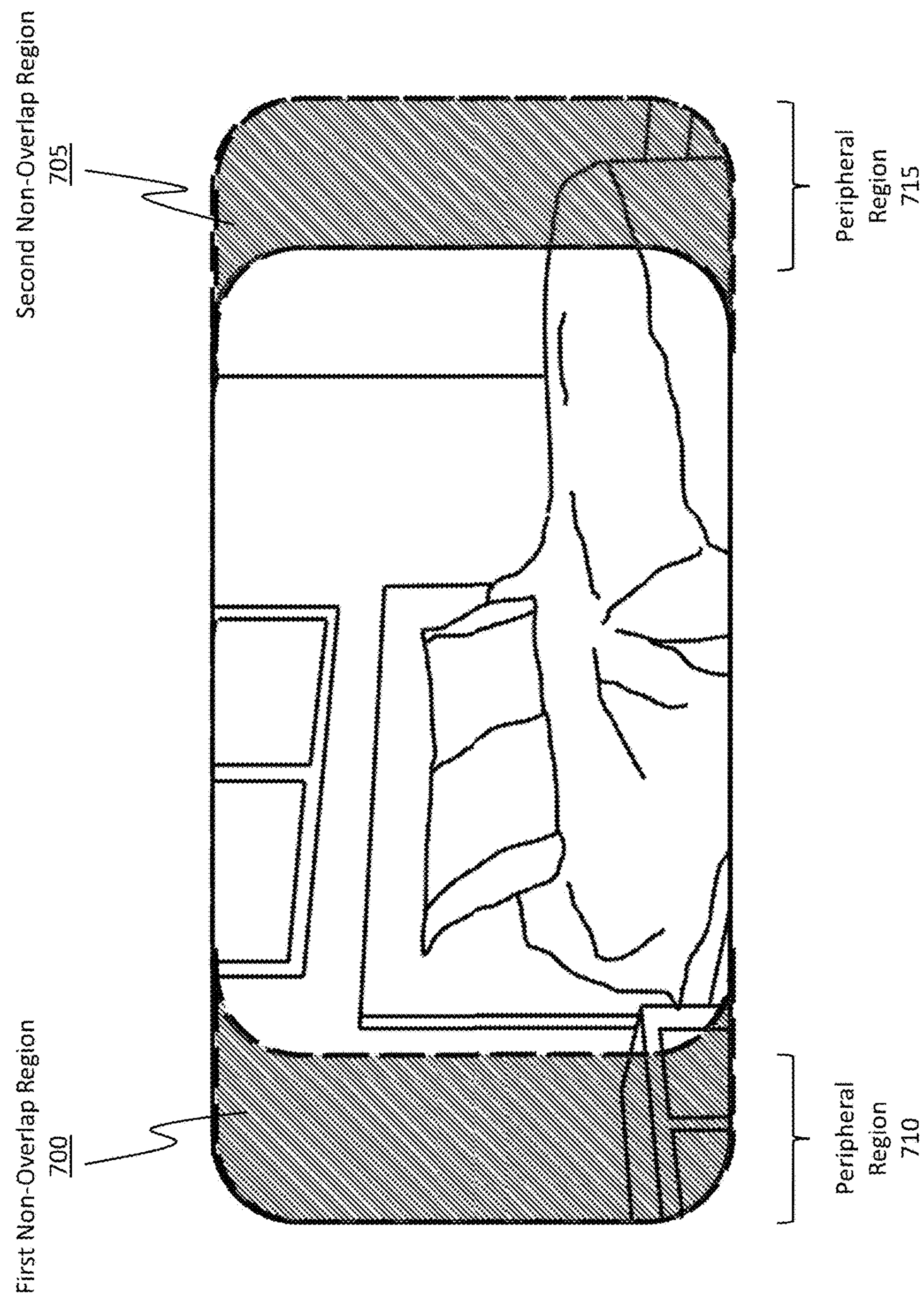
FIG. 7 illustrates how at least a portion of the two images included in the stereo pair do not overlap with one another.

Based on the above disclosure, one can observe how the horizontal range or resolution of the resulting depth map will be smaller than the horizontal range of an image displayed to the user. That is, the horizontal range of the depth map will be limited to correspond to the range of the overlap region 600 whereas the horizontal range of the image is larger. As a consequence, the peripheral regions of resulting images may not be properly corrected/transformed to solve the parallax problem because the depth map previously did not include depths for those peripheral areas. By way of additional clarification, it may be the case that the peripheral regions are the non-overlapping regions of an image's FOV and those non-overlapping regions have no depth associated therewith. FIG. 7 is illustrative.

Specifically, FIG. 7 builds on the concepts taught in FIG. 6 by showing how there are certain non-overlapping regions in the two images, such as the first non-overlap region 700 and the second non-overlap region 705. The first non-overlap region 700 is a region in the first image 505 from FIG. 5 where the FOV of the second image 510 does not overlap the FOV of the first image 505. Here, the first non-overlap region 700 is located at the peripheral region 710 of the first image 505. Similarly, the second non-overlap region 705 is a region in the second image 510 where the FOV of the first image 505 does not overlap the FOV of the second image 510. Here, the second non-overlap region 705 is located at the peripheral region 715 of the second image 510.

In some embodiments, one non-overlap region is at least 10% of the FOV of the corresponding image (aka a texture stereo image). In some embodiments, the non-overlap region is between 1% and 20% of the corresponding image's FOV. In most (but not necessarily all) embodiments, the overlap region occupies a majority of the image's FOV and the non-overlap region occupies a minority of the image's FOV.

Because the stereo matching 620 was limited to determining depths only for the overlap region 600, the stereo matching 620 will not produce depths for these non-overlapping regions shown in FIG. 7. When the parallax corrections are performed, the depth map may be successfully used to transform pixels having depth, but for those pixels that did not have depth (i.e. those pixels in the non-overlapping regions), those pixels may not be correctly transformed, thereby resulting in a potentially skewed or inaccurate passthrough image. The disclosed embodiments provide highly beneficial solutions to solving this problem.

FIGS. 8 through 15 discuss a technique of using a previously generated surface reconstruction mesh to fill in depth data for the non-overlapping regions mentioned above. Following that discussion, FIG. 1 will facilitate a discussion on how machine learning may be used to merge the non-overlapping regions with the overlapping regions. Subsequently, FIG. 17 will trigger a discussion on how an estimation operation may be performed to provide depths for the non-overlapping regions.

Using a Previously Generated Surface Reconstruction Mesh to "Fill in the Holes"

Some embodiments rely on a previously generated surface mesh reconstruction of the environment in order to obtain depth data for the areas represented by the non-overlapping regions discussed earlier. This surface mesh depth data can then be used to augment depth data generated by performing the stereo matching. Those two pieces of depth data can then be merged together to form a full and complete depth map. This new depth map, which should reflect the depths based on the HMD's current pose, can then be used to perform parallax correction and generate passthrough images. FIGS. 8 through 12 illustrate an example process by which the HMD scans an environment to trigger the generation of a surface reconstruction mesh.

Figure 8:
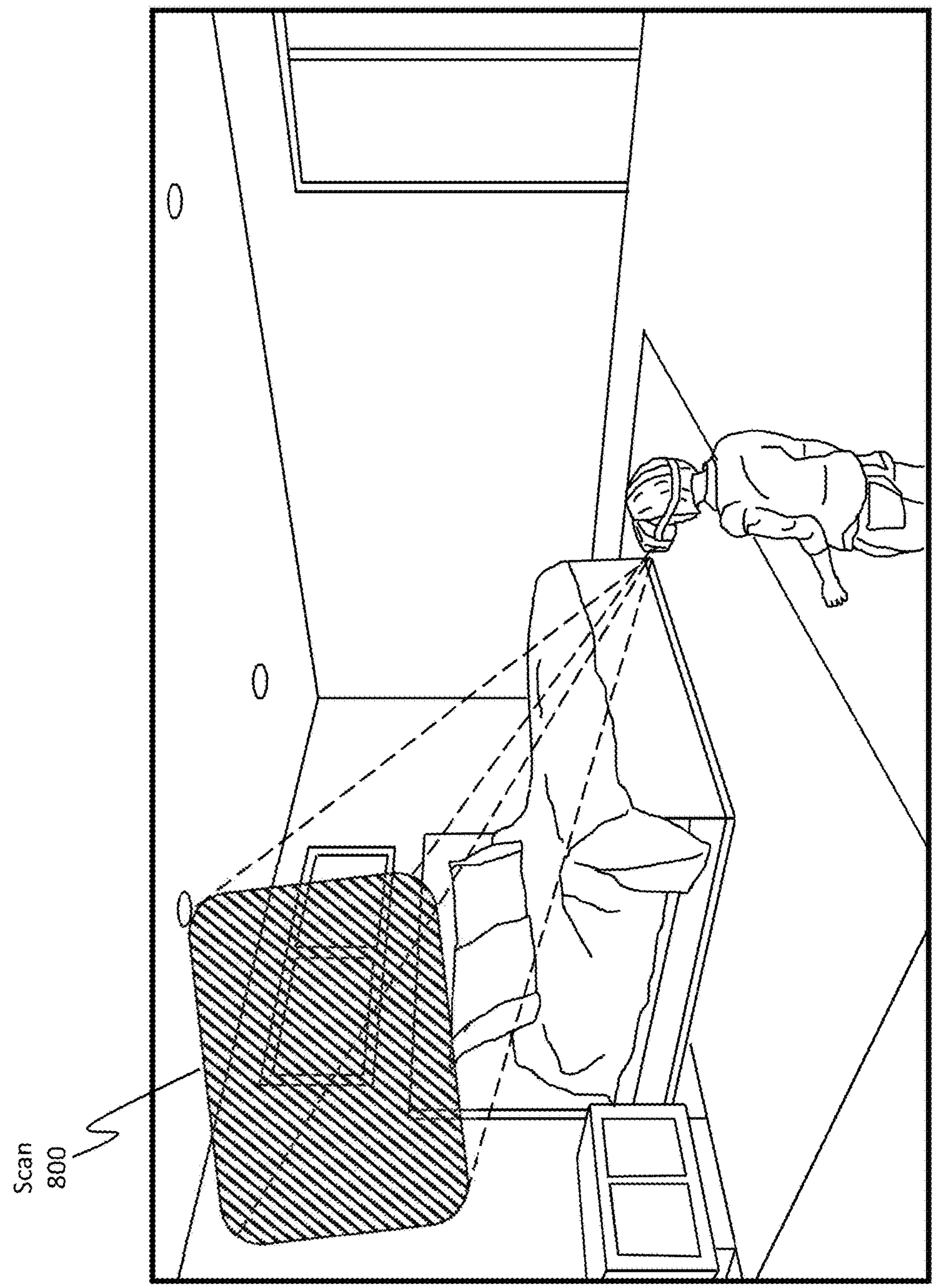
FIGS. 8, 9, 10, 11, and 12 illustrate an example process of generating a surface reconstruction mesh, which can subsequently be used to provide depth data for non-overlapping regions of a stereo pair of images.
Figure 9:
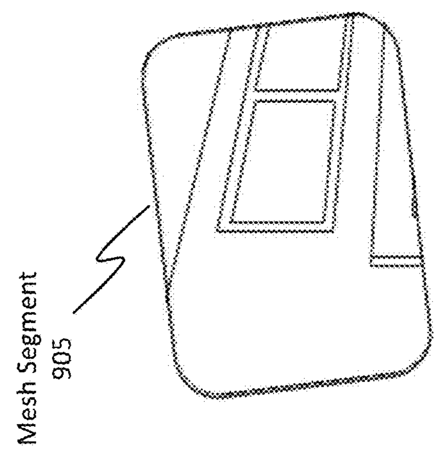

FIG. 8 shows how an HMD is able to initially scan 800 an environment using its cameras to generate texture stereo images of the environment, as discussed earlier. FIG. 9 shows how, based on the scan 800, which generated texture stereo images, the HMD (or perhaps a cloud service) is able to begin generating a surface reconstruction mesh 900 of the environment by performing, for example, stereo depth matching on the texture stereo images to determine depth. Because only a portion of the environment has been scanned, FIG. 9 shows how the surface reconstruction mesh 900 is initially incomplete and shows only a mesh segment 905, which reflects depths for the area of the environment captured by the scan 800 from FIG. 8.

Figure 10:
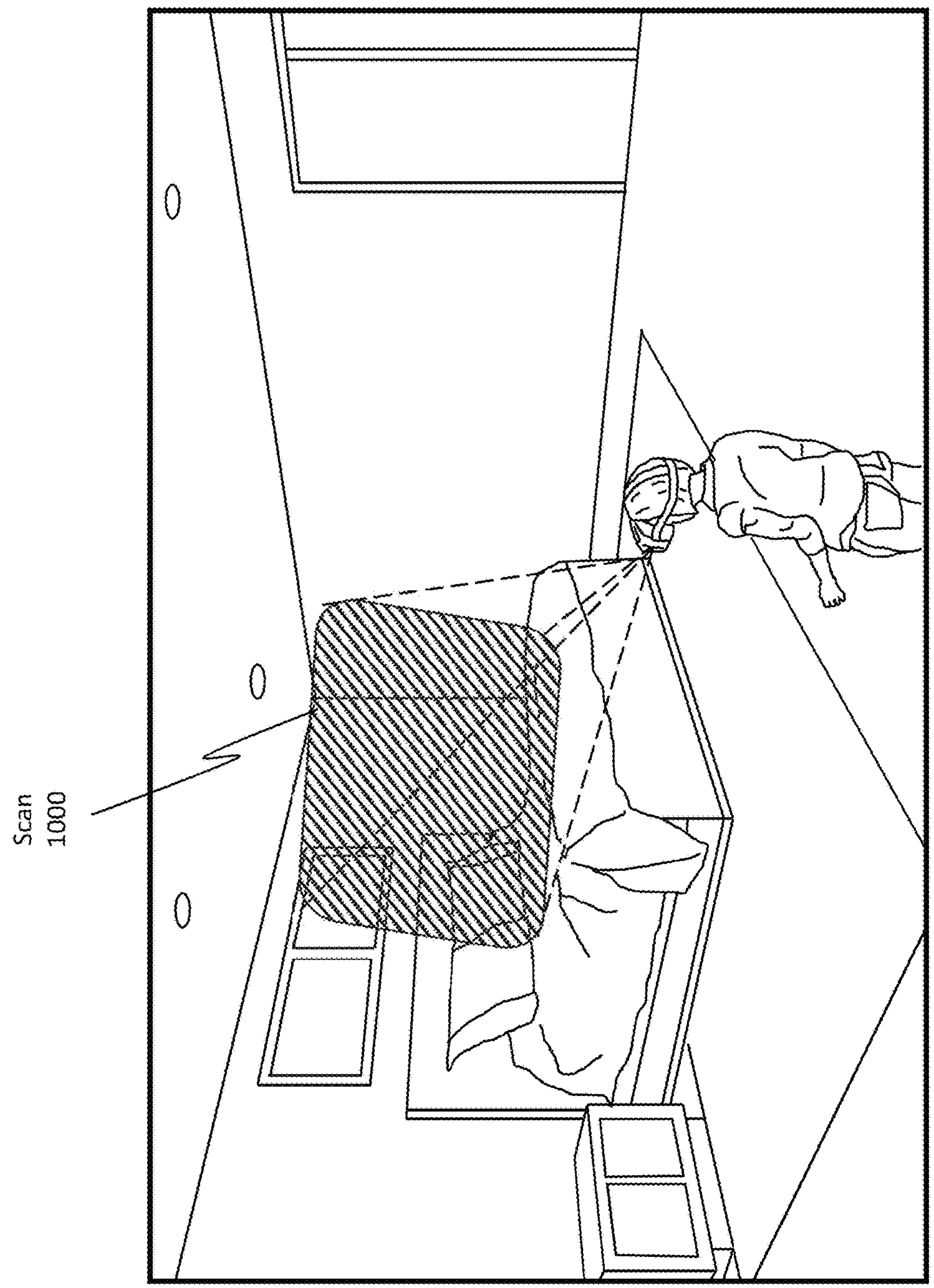
Figure 11:
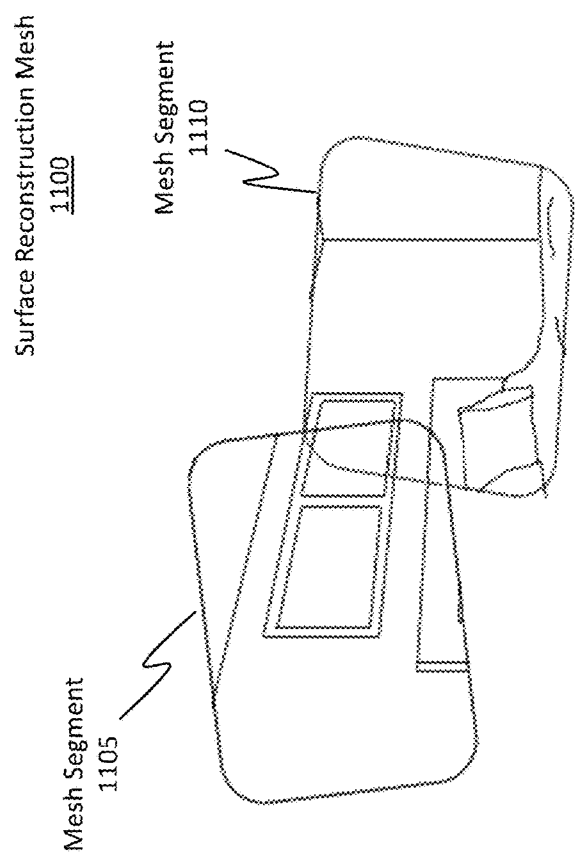
Figure 12:
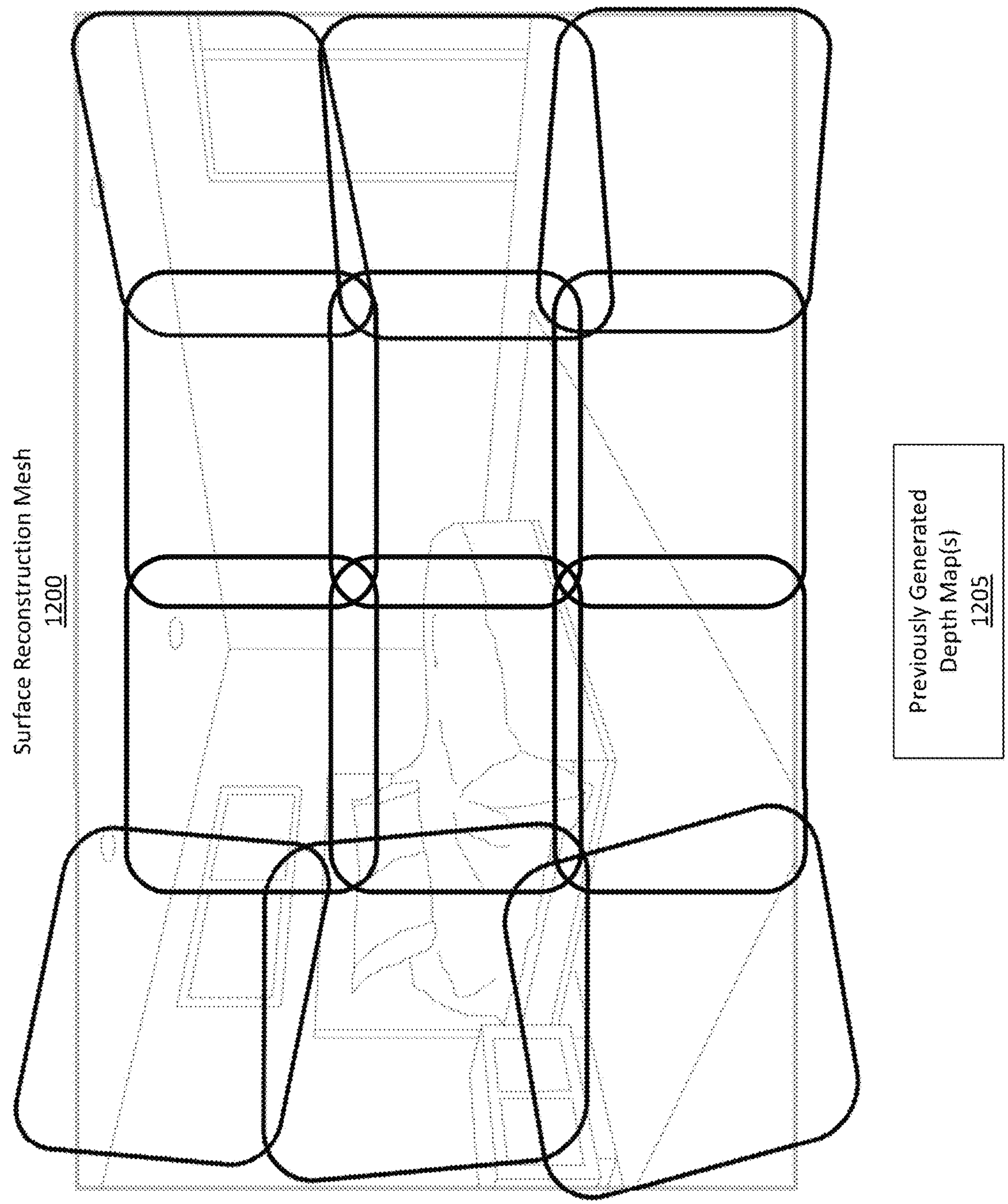

FIG. 10 shows how the HMD has shifted position and a new area of the environment is now being scanned, as shown by scan 1000. FIG. 11 shows how the surface reconstruction mesh 1100, which is representative of the surface reconstruction mesh 900 from FIG. 9, now includes multiple mesh segments, including mesh segment 1105 (corresponding to mesh segment 905 from FIG. 9) and mesh segment 1110, which represents the depths for the area captured by the scan 1000 from FIG. 10. Scanning new areas of the environment may continue until the environment has been mapped or reconstructed three-dimensionally. FIG. 12 shows a completed surface reconstruction mesh 1200, which is a completed version of the surface reconstruction meshes 900 of FIG. 9 and 1100 of FIG. 11.

Generating the surface reconstruction mesh 1200 may be initiated upon the HMD entering a new environment. In some cases, the environment may already have a surface reconstruction mesh, and the HMD can be triggered to update that mesh. In this regard, it may be the case that the surface reconstruction mesh 1200 may be based on any number of previous scans and/or previously generated depth map(s) 1205. That is, the previously generated depth map(s) 1205 may have been fused to generate the surface reconstruction mesh 1200 of the environment.

Figure 13:
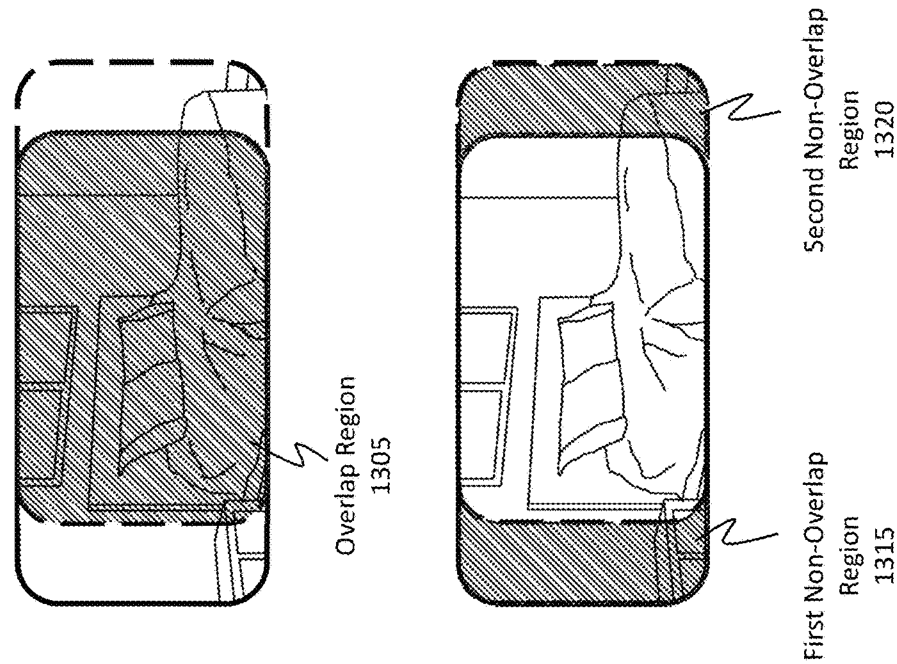
FIG. 13 illustrates how the surface reconstruction mesh can be used in conjunction with stereo matching to generate depth data.
Figure 13:
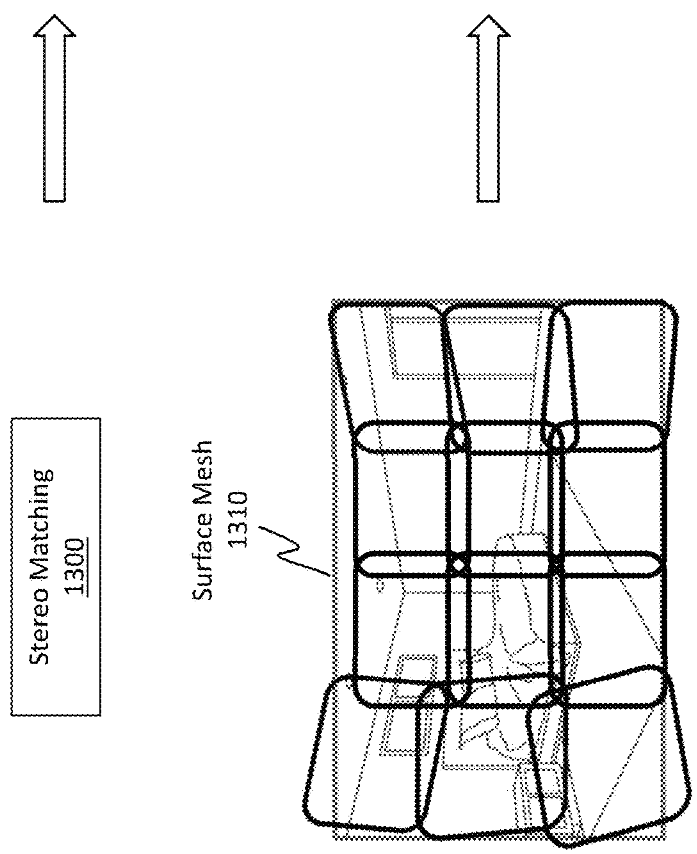

FIG. 13 shows an example scenario in which stereo matching 1300 is performed to determine the depths for pixels included in the overlap region 1305, as described earlier. Either in parallel or in series with the stereo matching 1300, the embodiments also extract depth data from the surface mesh 1310, which is representative of the meshes discussed thus far, to determine the depths for pixels included in the first non-overlap region 1315 and the depths for the pixels included in the second non-overlap region 1320. The embodiments are able to determine the current pose of the HMD using the texture stereo images that were previously generated and then use this pose to identify the same pose within the surface mesh 1310. Either the 6 degrees of freedom (DOF) pose or the 3 DOF pose may be determined. Once the orientation within the surface mesh 1310 is determined, then the embodiments can extract depth data, as shown in FIG. 14.

Figure 14:
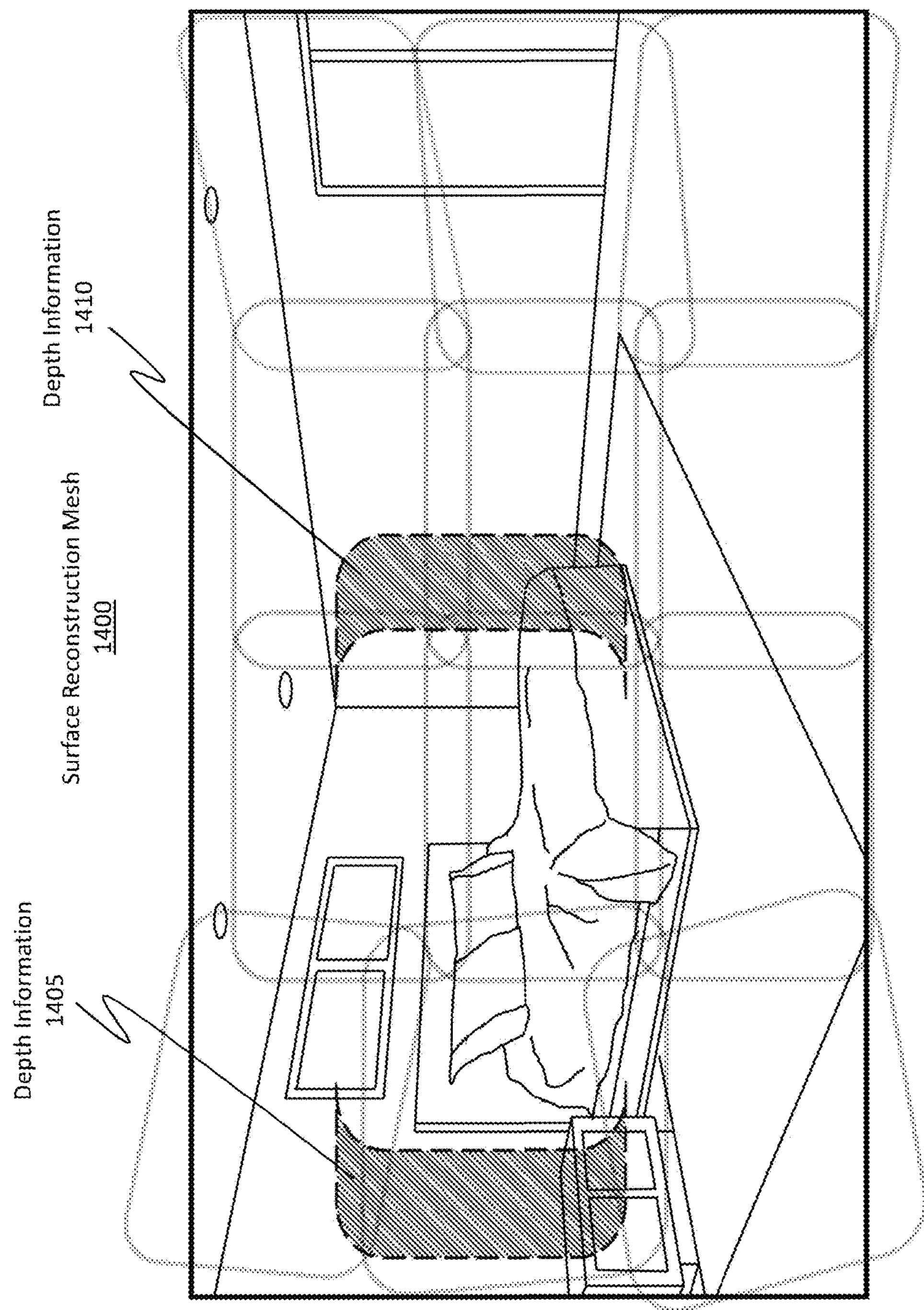
FIG. 14 illustrates how specific portions of depth data from the surface reconstruction mesh can be extracted, where those specific portions correspond to the non-overlapping regions of the stereo pair of images. This extracted depth data can then be used to help generate a complete depth map.

FIG. 14 shows a surface reconstruction mesh 1400, which is representative of the meshes discussed thus far. Additionally, the embodiments have selected specific depth information from the surface reconstruction mesh 1400, where that specific depth information corresponds to the non-overlapping regions. For instance, depth information 1405 corresponds to the first non-overlap region 1315 of FIG. 13, and depth information 1410 corresponds to the second non-overlap region 1320. As discussed above, selecting depth information from the surface reconstruction mesh 1400 is based on the current pose of the HMD.

Figure 15:
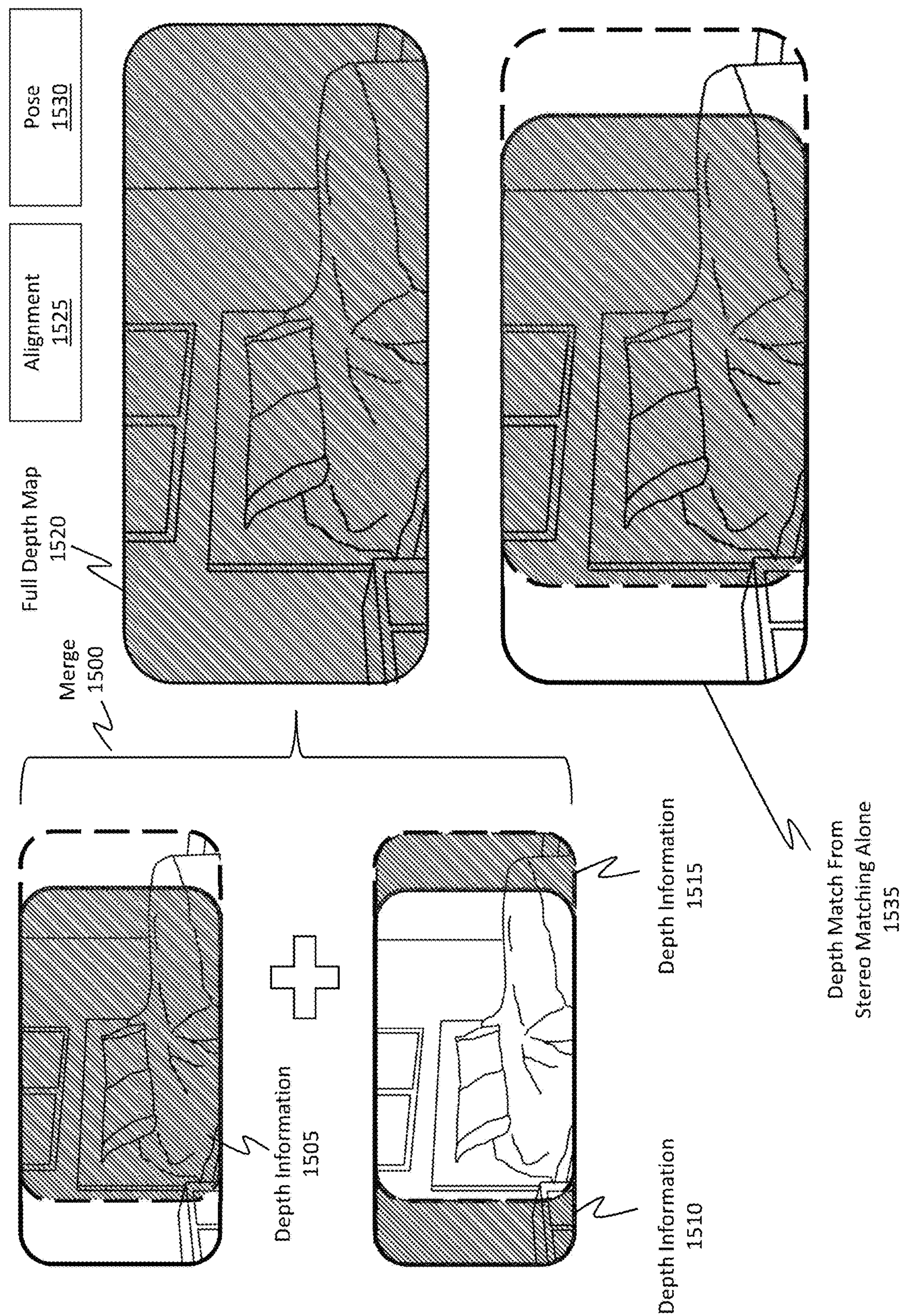
FIG. 15 illustrates how depth data acquired by performing stereo matching on the overlap region can be merged with depth data acquired from some other source besides the stereo pair of images (e.g., a surface reconstruction mesh, a machine learning model, or even an estimation process) to generate a full and complete depth map.

FIG. 15 then shows a merge 1500 operation in which the depth information 1505, which was generated by performing stereo matching, and the depth information 1510 and depth information 1515, which was obtained from the previously generated surface mesh (aka surface reconstruction mesh), are merged, stitched, fused, or otherwise combined to form the full depth map 1520. Here, the full depth map 1520 includes depth information for every pixel of the stereo images and not just for the overlapping region. This full depth map 1520 can then be used to perform an accurate parallax correction based on the HMD's current pose. To perform the merge 1500, some embodiments perform an alignment 1525 to ensure that the borders between the overlap region and the non-overlapping regions are correctly aligned to avoid depth discontinuities. Performing this alignment 1525 can also be based on the HMD's pose 1530. In some cases, depths at the borders can be smoothed or averaged together to ensure a smooth transition at those borders.

FIG. 15 shows a comparison between the full depth map 1520 and a depth map from stereo matching alone 1535. The shaded regions represent depth data. As shown, the full depth map 1520 includes depth data for every pixel whereas the other depth map is deficient in the peripheral regions. Accordingly, the disclosed embodiments are able to perform one depth gathering process for the overlapping regions and a different depth gathering process for the non-overlapping regions. With this approach, a surface reconstruction mesh can operate as a source for depth data for the non-overlapping regions.

Figure 16:
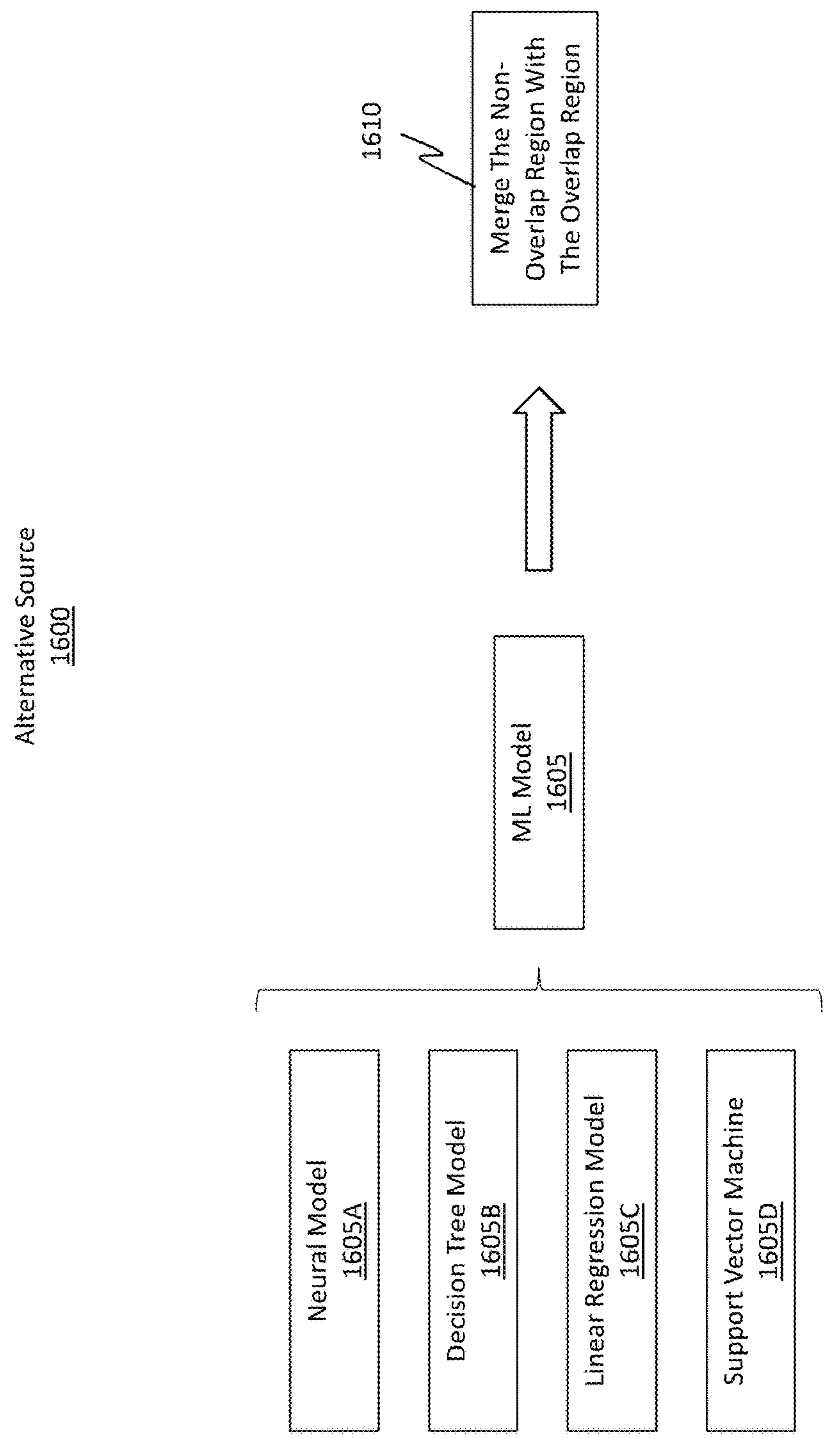
FIG. 16 illustrates use of an alternative source for generating depth data for the non-overlapping regions, where this alternative source is a machine learning model.

Alternative Source: Using ML to Generate Depth Data for the Non-Overlapping Regions FIG. 16 shows an alternative source 1600 for obtaining depth data for the non-overlapping regions. Specifically, the alternative source 1600 is a machine learning (ML) model 1605.

Any type of ML model or machine learning may be used. For instance, FIG. 16 illustrates how the ML model 1605 may be implemented using different types of algorithms or models. In some embodiments, a machine learning algorithm may be trained to perform the disclosed operations. As used herein, reference to "machine learning" or to a ML model may include any type of machine learning algorithm or device, neural network 1605A (e.g., convolutional neural network(s), multilayer neural network(s), recursive neural network(s), deep neural network(s), dynamic neural network(s), etc.), decision tree model(s) 1605B (e.g., decision trees, random forests, and gradient boosted trees), linear regression model(s) 1605C or logistic regression model(s), support vector machine(s) ("SVM") 1605D, artificial intelligence device(s), or any other type of intelligent computing system. Any amount of training data may be used (and perhaps later refined) to train the machine learning algorithm to dynamically perform the disclosed operations.

Generally, the ML model 1605 performs an operation 1610 of merging the non-overlap region with the overlap region. For instance, by using previous depth information with pose estimation, the embodiments are able to blend the parallax-corrected depth regions (i.e. the overlapping regions) into the non-overlapping regions.

More specifically, any type of previously generated surface reconstruction mesh can be used to initially train the ML model 1605 to determine object depths. With that input, the ML model 1605 can then learn how images corresponding to that previously generated surface reconstruction mesh are typically warped based on parallax reprojection.

With the above training, the ML model 1605 can then be applied to a current set of images that require parallax correction for the non-overlapping regions. That is, with this machine learning approach, the embodiments still perform stereo matching for the overlapping regions, but then the embodiments utilize machine learning to determine how to apply depths to the non-overlapping regions. In this regard, it is possible to train the ML model 1605 based on past parallax corrected images and past surface reconstruction meshes. The ML generated depth information may then be combined with the stereo matching depth information to form the full depth map described earlier. Accordingly, a source used to provide depth data for non-overlapping regions may be a ML model (e.g., a neural model, etc.) that operates to merge the non-overlap region with the overlap region.

Figure 17:
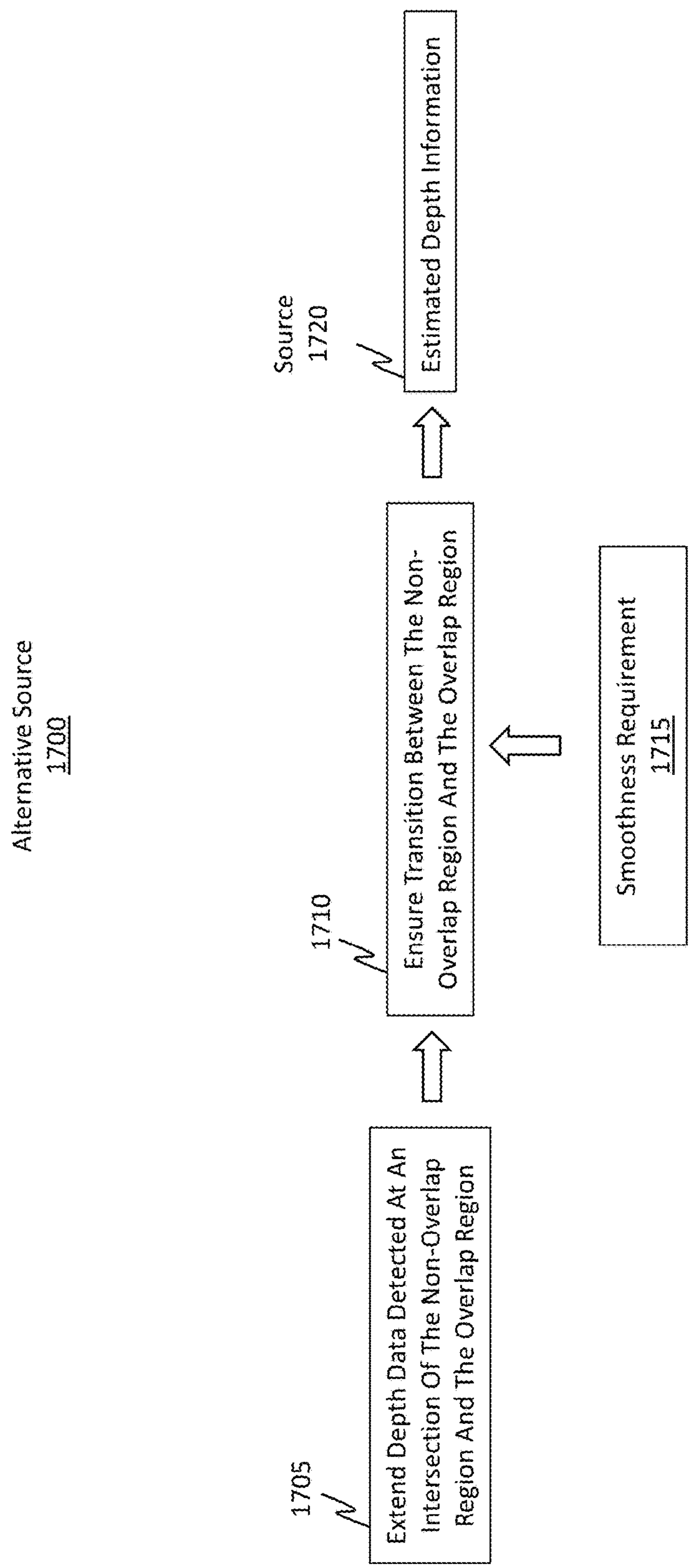
FIG. 17 illustrates use of another alternative source for generating depth data for the non-overlapping regions, where this alternative source is estimated depth information.

Alternative Source: Estimating Depth Information for the Non-Overlapping Regions FIG. 17 shows another alternative source 1700 for generating or obtaining depth data for the non-overlapping regions. This alternative source is a body of estimated depth data that is acquired in the following manner.

As shown in step 1705, there is an operation of extending depth data detected at an intersection of the non-overlap region and the overlap region. For instance, pixels having the same color or intensity in the raw texture images at the border between the non-overlapping region and the overlapping region may be assigned common depth values. Next, in step 1710 there is an operation of ensuring a smooth transition between the non-overlap region and the overlap region. This smooth transition may be based on a smoothness requirement 1715 that prevents depth jumps or discontinuities beyond a threshold defined by the smoothness requirement 1715. In performing these operations, the embodiments generate so-called estimated depth information, as reflected by the source 1720. This estimated depth information can then be combined with the depth information obtained from performing stereo matching for the overlapping region to form the full depth map described earlier.

Accordingly, this approach describes a technique of extending the depth maps that were detected at the intersection of the binocular (i.e. the overlapping region) to the non-binocular region (i.e. the non-overlapping region) while also ensuring a smooth transition between the two regions by imposing the smoothness requirement 1715.

By way of additional clarification and an additional example, this estimation process can be performed by taking the plane of the depth map generated from stereo matching and continuing to reproject that plane outward into the non-overlapping regions. A specific example will be helpful.

Suppose an HMD is directed towards a wall or some other object/region. Based on the depth map generated from stereo matching, the HMD understands there is a plane or object being represented in the overlapping region. If that plane or object intersects the border between the overlap and non-overlap region, then the HMD is able to selectively extend that plane or object further out into the non-overlapping regions to provide depth for those regions. Doing so would ensure that a continuous mapping is generated from the binocular overlap region to the non-binocular region.

By "extending the plane," what is meant is that the embodiments apply the depth measurements to those non-overlapping regions based on the depths computed for the plane in the overlapping region. In this regard, it is possible to extend the depth values outward. Of course, such an operation can be performed for any plane or surface detected in the overlapping region in an effort to fill in depth for the non-overlapping regions.

This so-called estimation process is different from the ML process described earlier in a number of ways. For instance, the ML process uses observations from previously generated parallax-corrected images. In contrast, this estimation process operates to effectively generate new pixel depth data. Accordingly, in some embodiments, the source for the non-overlapping regions is estimated depth information. As described above, this estimated depth information is estimated by extending depth data detected at an intersection of the non-overlap region and the overlap region to ensure a smooth transition between the non-overlap region and the overlap region, where the transition satisfies a smoothness requirement.

Parallax Correction

Figure 18:
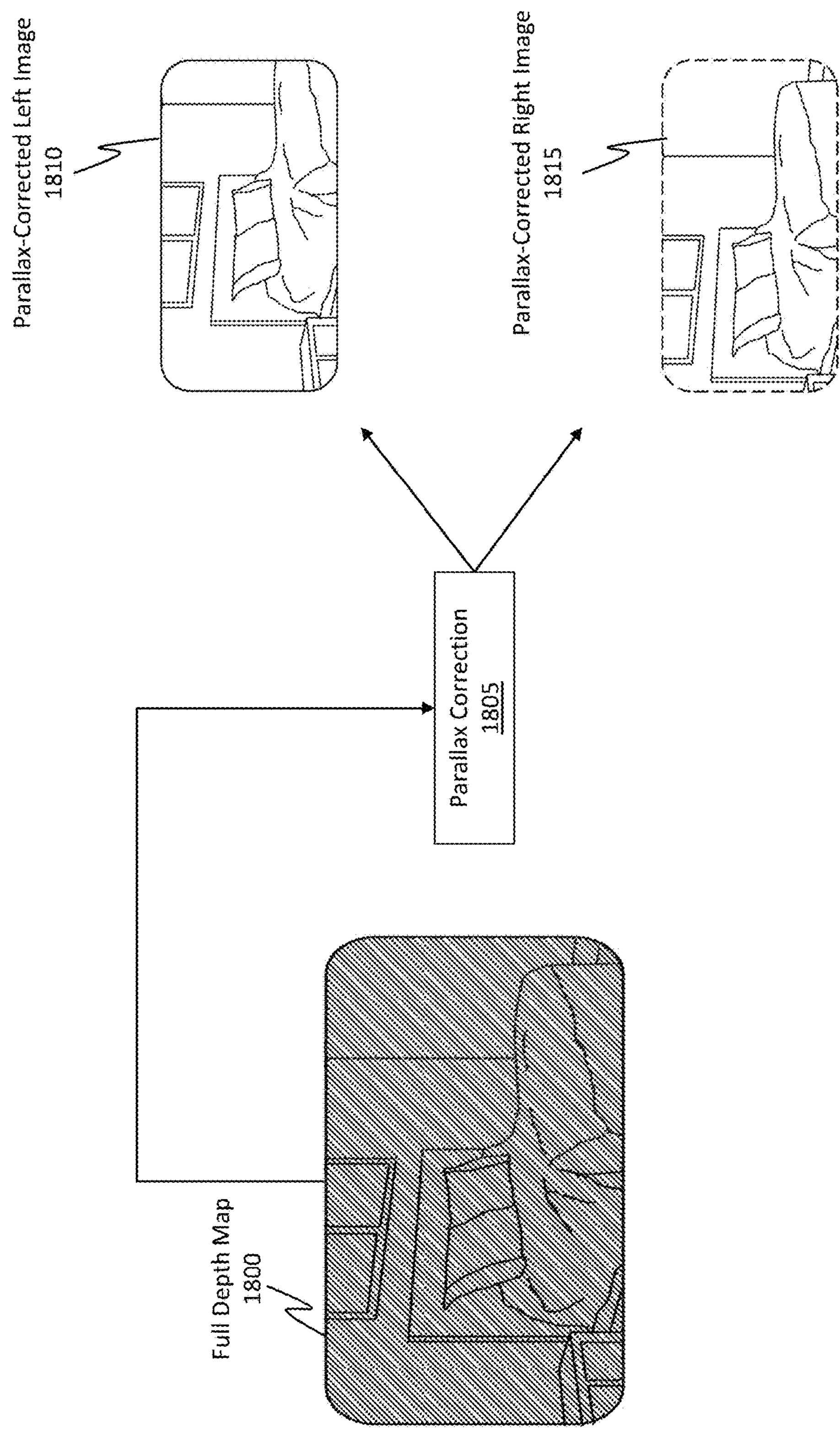
FIG. 18 illustrates how the full depth map can be used to perform parallax correction to generate parallax-corrected images (e.g., passthrough images or other holographic content).

FIG. 18 shows how a full depth map 1800, which is representative of the full depth maps discussed thus far, can then be used to perform parallax correction 1805. By performing the parallax correction 1805, it is possible to generate a parallax-corrected left image 1810 and a parallax-corrected right image 1815 in the manner discussed in connection with FIGS. 2 and 3. Accordingly, multiple different sources may be used to generate depth data for the non-overlapping regions.

Example Method(s) for Improving the Generation of Depth Maps

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 19A:
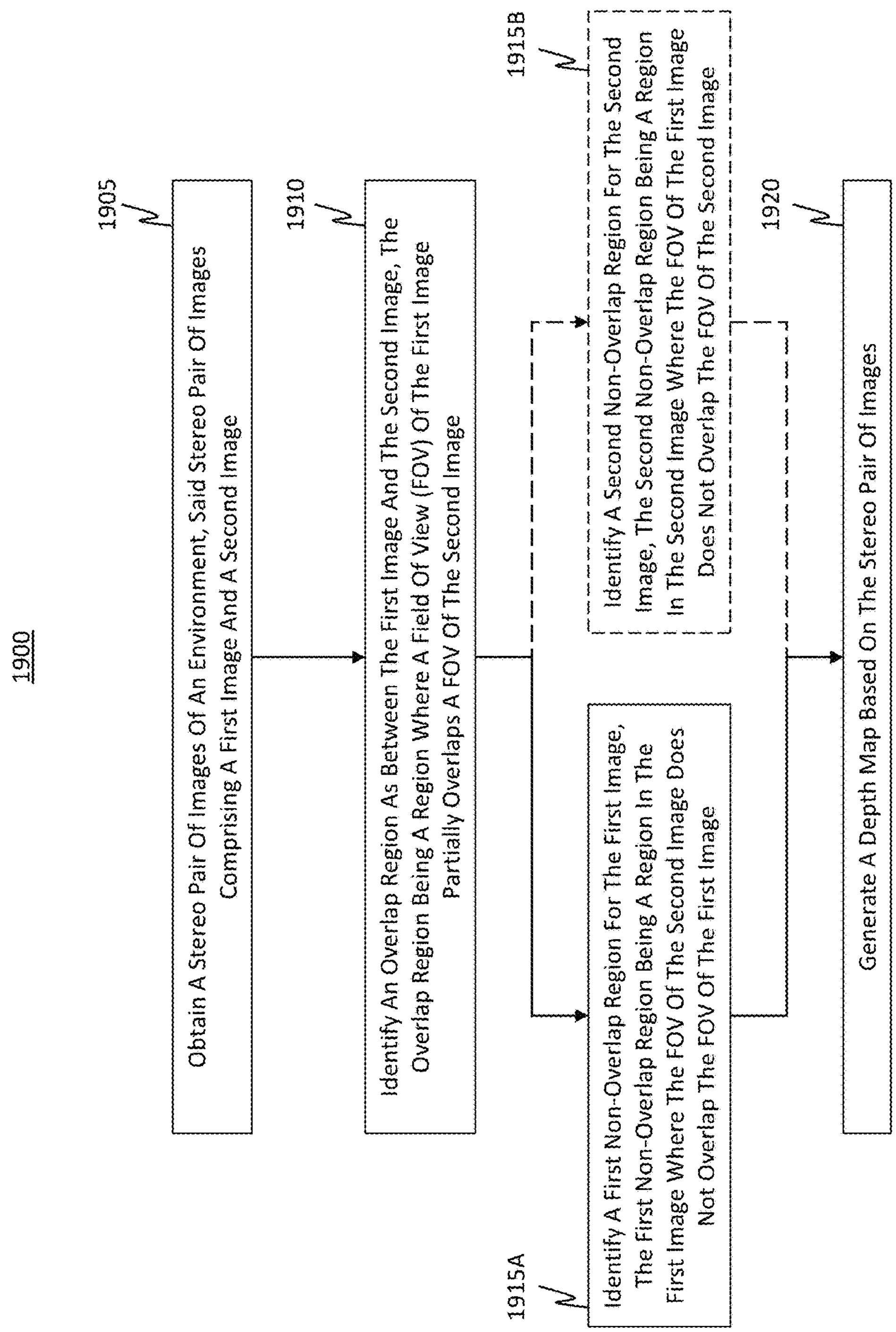
FIGS. 19A, 19B, and 19C illustrate flowcharts of an example method for improving how depth maps are generated.

Attention will now be directed to FIG. 19A, which illustrates a flowchart of an example method 1900 designed to facilitate improvements in how depth maps are generated. The method 1900 may be performed by any of the HMDs discussed thus far or even the computer system that will be discussed later in FIG. 20. In some cases, the method 1900 is triggered in response to a detection of a new pose of the HMD relative to the environment. Having a new pose suggests that updated parallax-corrected images should potentially be generated.

Initially, method 1900 includes an act (act 1905) of obtaining a stereo pair of images of an environment. This stereo pair of images includes a first image and a second image. The first image 505 and the second image 510 from FIG. 5 are representative of the images described in this act. Notably, the first image is generated by a first camera positioned on the HMD, and the second image is generated by a second camera positioned on the HMD.

Method 1900 also includes an act (act 1910) of identifying an overlap region as between the first image and the second image. Notably, the overlap region is a region where a field of view (FOV) of the first image partially overlaps a FOV of the second image. The overlap region 600 provides a useful illustration of this aspect.

The method 1900 continues by identifying (act 1915A) a first non-overlap region for the first image. Here, the first non-overlap region is a region in the first image where the FOV of the second image does not overlap the FOV of the first image. The first non-overlap region 700 of FIG. 7 is representative.

Method 1900 includes an additional operation that may, but not necessarily, be performed if there are more than one non-overlapping region. Such an operation, as represented by act 1915B, may be performed in unison or in parallel with act 1915A or it may be performed before or after act 1915A. In particular, act 1915B includes identifying a second non-overlap region for the second image. This second non-overlap region is a region in the second image where the FOV of the first image does not overlap the FOV of the second image. The second non-overlap region 705 from FIG. 7 is representative.

This operation is listed as being optional because it may be the case that one image's FOV entirely includes or envelopes the FOV of another image (meaning the other image will not have any non-overlapping regions), even though the cameras that generated those images are located at different positions on the HMD. For instance, it may be the case that a visible light camera and a low light camera are generally aimed at the same location but are positioned at different locations on the HMD. In this example, the FOV of the visible light camera may be smaller than the FOV of the low light camera. The difference in these FOVs may be such that images generated by the low light camera include, in its entirety, all of the content captured by the image of the visible light camera. As a consequence, only the low light camera's image has non-overlapping regions, and the visible light camera's image does not have any non-overlapping regions. Accordingly, act 1915B is shown in a dotted box because it can be optional.

Figure 19B:
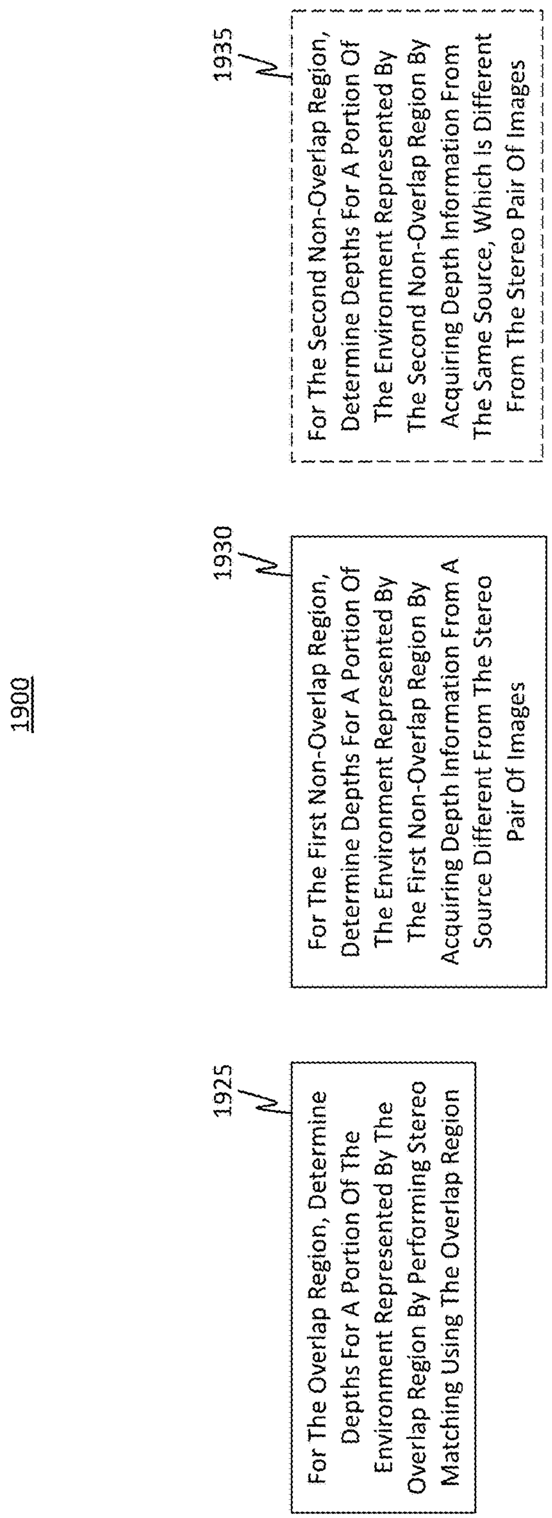

Method 1900 includes an act (act 1920) of generating a depth map based on the stereo pair of images. FIG. 19B provides additional information regarding how this generation process occurs.

For instance, FIG. 19B shows a continuation of method 1900 from FIG. 19A with the inclusion of a few additional steps. These steps may be performed in parallel or in serial.

One step is outlined in act 1925. This act involves determining depths for the overlap region identified in act 1910. Specifically, act 1925 involves determining depths for a portion of the environment represented by the overlap region by performing stereo matching using the overlap region. The stereo matching 1300 from FIG. 13 described this process.

Another step is outlined in act 1930. This act involves determining depths for the first non-overlap region. Specifically, act 1930 involves determining depths for a portion of the environment represented by the first non-overlap region by acquiring depth information from a source different from the stereo pair of images. This source may be a previously generated or acquired surface reconstruction mesh, a ML model, or estimated depth information, as previously described in the earlier figures. In some implementation, determining the depths for the portion of the environment represented by the non-overlap region(s) includes performing an alignment (e.g., alignment 1525 mentioned in FIG. 15) between the depth information from the source and stereo-generated depth information generated by the stereo matching. This alignment may be based on a detected pose of the HMD or perhaps anchor points identified in the environment and the images.

Method 1900 may optionally include another act, namely act 1935. This act is performed if the embodiments detected the second non-overlap region, as described in act 1915B of FIG. 19A. Here, act 1935 involves determining depths for a portion of the environment represented by the second non-overlap region by acquiring depth information from the same source, which is different from the stereo pair of images. Again, the source may be the previously generated or acquired surface reconstruction mesh, the ML model, or the estimated depth information, as previously described in the earlier figures. If a determination is made that the same source does not include depth information for the second non-overlap region, then a different source made be used. For instance, suppose the surface reconstruction mesh does not include depth data for the second non-overlap region. In this case, then either one of the ML model or the estimated depth information may be used. Accordingly, combinations of the principles disclosed herein may be used to acquire or generate depth data.

Figure 19C:
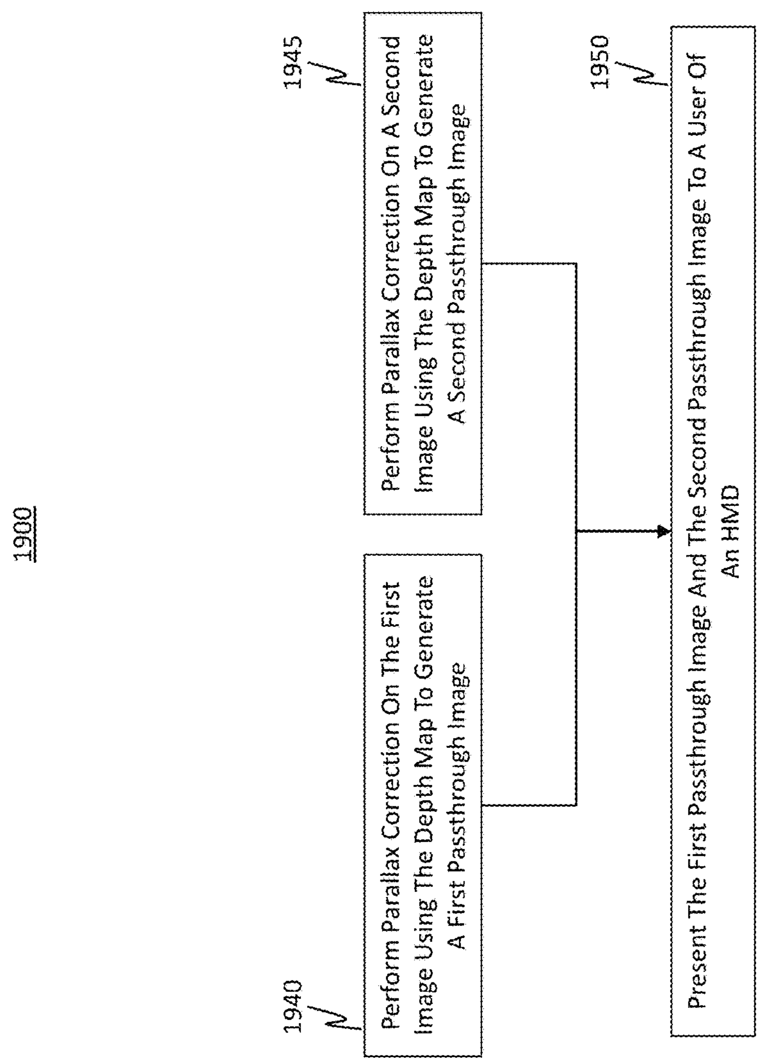

In some embodiments, method 1900 may include some additional acts, as recited in FIG. 19C. For instance, once the depth map is generated in accordance with acts 1905 through possibly 1935, there is an act (act 1940) of performing parallax correction on the first image recited in act 1905 using the depth map to generate a first passthrough image. In parallel or in series with act 1940, there is an act (act 1945) of performing parallax correction on the second image recited in act 1905 using the depth map to generate a second passthrough image. The first and second passthrough images were illustrated in FIG. 18. Thereafter, there is an act (act 1950) of presenting the first passthrough image and the second passthrough image to a user of the HMD.

Accordingly, the disclosed embodiments present techniques for improving how depth maps are generated. In general, the embodiments obtain depth data using stereo matching for certain areas of an image and then obtain depth data for remaining areas from one (or more) source(s) different from the original texture images themselves. In this regard, separate depth-gathering or depth-generating operations are performed for the overlap region and the non-overlap region(s). By performing these operations, significant improvements in depth map generation are achieved because a more full and robust depth map is created. This fuller depth map can then be used to improve parallax correction, which improves the user's experience with the computer system or HMD.

One will appreciate how the disclosed principles are not limited to scenarios involving only passive stereo image generation to generate the stereo pair of images. Indeed, the principles may also be practiced in the context of other types of depth determining or image generation scenarios in which a non-overlapping condition between images may occur. By way of example and not limitation, the principles may also be performed in the context of active stereo image generation, which involves 2 cameras and 1 dot illuminator (e.g., dot illuminator 230 from FIG. 2). The principles also apply to any type of structured light image generation, which involves 1 actual camera, 1 virtual camera, and 1 dot illuminator (e.g., dot illuminator 230 from FIG. 2). The principles further apply to image generation using time of flight (TOF) sensors where there is a baseline between the TOF laser and the TOF camera. In this case, the FOV of the TOF camera does not perfectly overlap the field of illumination of the TOF laser, thereby resulting in a non-overlapping region that can be filled in by practicing the disclosed principles. Each of the above scenarios results in a condition in which multiple images are formed and in which only portions of those multiple images overlap with one another. Other portions of those images are non-overlapping with one another and thereby cause the same issues that were discussed earlier in this disclosure. Accordingly, any type of depth detection or image generation process involving the occurrence of non-overlap between images may be used in the disclosed embodiments.

Example Computer/Computer Systems

Figure 20:
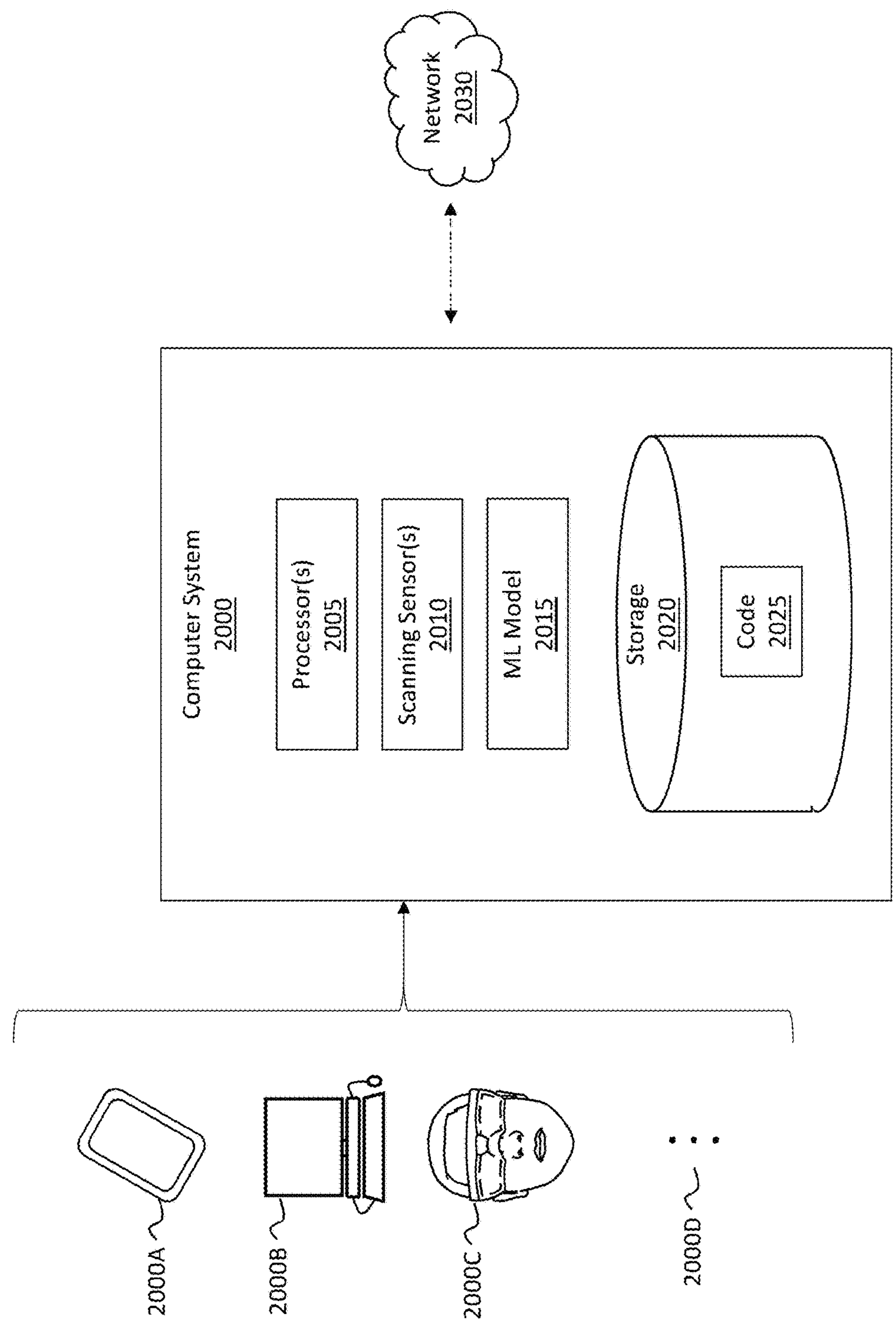
FIG. 20 illustrates an example computer system configured to perform any of the disclosed operations.

Attention will now be directed to FIG. 20 which illustrates an example computer system 2000 that may include and/or be used to perform any of the operations described herein. Computer system 2000 may take various different forms. For example, computer system 2000 may be embodied as a tablet 2000A, a desktop or a laptop 20008, a wearable device such as an HMD 2000C (which is representative of the HMDs discussed herein), a mobile device, or any other type of standalone device, as represented by the ellipsis 2000D. Computer system 2000 may also be a distributed system that includes one or more connected computing components/devices that are in communication with computer system 2000.

In its most basic configuration, computer system 2000 includes various different components. FIG. 20 shows that computer system 2000 includes one or more processor(s) 2005 (aka a "hardware processing unit"), scanning sensor(s) 2010 (such as those described in FIG. 2), a ML model 2015 (such as that described in FIG. 16), and storage 2020.

Regarding the processor(s) 2005, it will be appreciated that the functionality described herein can be performed, at least in part, by one or more hardware logic components (e.g., the processor(s) 2005). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

Any type of depth detection may be performed by the computer system 2000 and by the scanning sensor(s) 2010. Examples include, but are not limited to, stereoscopic depth detection (both active illumination (e.g., using a dot illuminator), structured light illumination (e.g., 1 actual camera, 1 virtual camera, and 1 dot illuminator), and passive (i.e. no illumination)), time of flight depth detection (with a baseline between the laser and the camera, where the field of view of the camera does not perfectly overlap the field of illumination of the laser), range finder depth detection, or any other type of range or depth detection.

The ML model 2015 may be implemented as a specific processing unit (e.g., a dedicated processing unit as described earlier) configured to perform one or more specialized operations for the computer system 2000. As used herein, the terms "executable module," "executable component," "component," "module," "model," or "engine" can refer to hardware processing units or to software objects, routines, or methods that may be executed on computer system 2000. The different components, modules, engines, models, and services described herein may be implemented as objects or processors that execute on computer system 2000 (e.g. as separate threads). The ML model 2015 and/or the processor(s) 2005 can be configured to perform one or more of the disclosed method acts or other functionalities.

Storage 2020 may be physical system memory, which may be volatile, non-volatile, or some combination of the two. The term "memory" may also be used herein to refer to non-volatile mass storage such as physical storage media. If computer system 2000 is distributed, the processing, memory, and/or storage capability may be distributed as well.

Storage 2020 is shown as including executable instructions (i.e. code 2025). The executable instructions represent instructions that are executable by the processor(s) 2005 (or perhaps even the ML model 2015) of computer system 2000 to perform the disclosed operations, such as those described in the various methods.

The disclosed embodiments may comprise or utilize a special-purpose or general-purpose computer including computer hardware, such as, for example, one or more processors (such as processor(s) 2005) and system memory (such as storage 2020), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2000 may also be connected (via a wired or wireless connection) to external sensors (e.g., one or more remote cameras) or devices via a network 2030. For example, computer system 2000 can communicate with any number devices or cloud services to obtain or process data. In some cases, network 2030 may itself be a cloud network. Furthermore, computer system 2000 may also be connected through one or more wired or wireless networks 2030 to remote/separate computer systems(s) that are configured to perform any of the processing described with regard to computer system 2000.

A "network," like network 2030, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2000 will include one or more communication channels that are used to communicate with the network 2030. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system configured to facilitate improvements in generating a depth map, said computer system comprising:

one or more processors; and one or more computer-readable hardware storage devices storing executable instructions that are executable by the one or more processors to cause the computer system to at least:

obtain a stereo pair of images of an environment, said stereo pair of images comprising a first image and a second image;

identify an overlap region as between the first image and the second image, the overlap region being a region where a field of view (FOV) of the first image partially overlaps a FOV of the second image;

identify a non-overlap region for the first image, the non-overlap region being a region in the first image where the FOV of the second image does not overlap the FOV of the first image; and generate a depth map based on the stereo pair of images, said generating comprising:

for the overlap region, determine depths for a portion of the environment represented by the overlap region by performing stereo matching using the overlap region; and for the non-overlap region, determine depths for a portion of the environment represented by the non-overlap region by acquiring depth information from a source different from the stereo pair of images, wherein the source is estimated depth information that is estimated by extending depth data detected at an intersection of the non-overlap region and the overlap region to ensure a transition between the non-overlap region and the overlap region, where the transition satisfies a smoothness requirement.

2. The computer system of claim 1, wherein extending the depth data includes taking a plane of the depth map generated from the stereo matching and continuing to reproject that plane outward into the non-overlap region.

3. The computer system of claim 1, wherein the estimated depth information is new pixel depth data.

4. The computer system of claim 1, wherein the non-overlap region is at least 10% of the FOV of the first image.

5. The computer system of claim 1, wherein the non-overlap region comprises at least a 10-degree horizontal range of the FOV of the first image.

6. The computer system of claim 1, wherein the FOV of the first image comprises at least a 60-degree horizontal range.

7. The computer system of claim 1, wherein the executable instructions further cause the computer system to apply parallax correction using the depth map.

8. The computer system of claim 1, wherein the first image is generated by a first camera and the second image is generated by a second camera, and wherein the first camera is one camera selected from a group of cameras comprising a visible light camera, a low light camera, or a thermal imaging camera, and wherein the second camera is also one camera selected from the group of cameras.

9. The computer system of claim 1, wherein the executable instructions further cause the computer system to identify a second non-overlap region for the second image, the second non-overlap region being a region in the second image where the FOV of the first image does not overlap the FOV of the second image, and wherein generating the depth map based on the stereo pair of images further comprises, for the second non-overlap region, determining depths for a portion of the environment represented by the second non-overlap region by acquiring depth information from the same source, which is different from the stereo pair of images.

10. A method for facilitating improvements in generating a depth map, said method comprising:

obtaining a stereo pair of images of an environment, said stereo pair of images comprising a first image and a second image;

identifying an overlap region as between the first image and the second image, the overlap region being a region where a field of view (FOV) of the first image partially overlaps a FOV of the second image;

identifying a non-overlap region for the first image, the non-overlap region being a region in the first image where the FOV of the second image does not overlap the FOV of the first image; and generating a depth map based on the stereo pair of images, said generating comprising:

for the overlap region, determine depths for a portion of the environment represented by the overlap region by performing stereo matching using the overlap region; and for the non-overlap region, determine depths for a portion of the environment represented by the non-overlap region by acquiring depth information from a source different from the stereo pair of images, wherein determining the depths for the portion of the environment represented by the non-overlap region includes performing an alignment between the depth information from the source and stereo-generated depth information generated by the stereo matching, and the alignment is based on a detected pose of a computer system performing said method.

11. The method of claim 10, wherein the computer system is a head-mounted device (HMD), wherein the method is triggered in response to a detection of a new pose of the HMD relative to the environment, and wherein the stereo pair of images is obtained as a result of performing any one or more of the following operations:

active stereo image generation via use of two cameras and one dot illuminator;

passive stereo image generation via use of two cameras;

image generation using structured light via use of one actual camera, one virtual camera, and one dot illuminator; or image generation using a time of flight (TOF) sensor in which a baseline is present between a TOF depth laser and a TOF camera and in which a field of view (FOV) of the TOF camera is offset relative to a field of illumination of the TOF depth laser.

12. The method of claim 10, wherein the computer system is a head-mounted device (HMD), wherein the first image is generated by a first camera positioned on the HMD and the second image is generated by a second camera positioned on the HMD, and wherein the method further includes:

performing parallax correction on the first image using the depth map to generate a first passthrough image;

performing parallax correction on the second image using the depth map to generate a second passthrough image; and presenting the first passthrough image and the second passthrough image to a user of the HMD.

13. The method of claim 10, wherein the non-overlap region is a peripheral region of the first image's FOV.

14. The method of claim 10, wherein the computer system is a head-mounted device (HMD), wherein the first image is generated by a first camera positioned on the HMD and the second image is generated by a second camera positioned on the HMD, and wherein the first camera and the second camera are positioned on the HMD to have a physical toe-out orientation relative to one another, said toe-out orientation causing the first image's FOV to only partially overlap the second image's FOV.

15. The method of claim 10, wherein previously generated depth maps were fused to generate a surface reconstruction mesh of the environment, and wherein the source is the surface reconstruction mesh.

16. The method of claim 10, wherein the source is a machine learning engine that operates to merge the non-overlap region with the overlap region.

17. The method of claim 10, wherein the FOV of the first image comprises at least a 60-degree horizontal range.

18. A head-mounted device (HMD) configured to facilitate improvements in generating a depth map, said HMD comprising:

one or more processors; and one or more computer-readable hardware storage devices that store instructions that are executable by the one or more processors to cause the HMD to at least:

obtain a stereo pair of images of an environment, said stereo pair of images comprising a first image and a second image;

identify an overlap region as between the first image and the second image, the overlap region being a region where a field of view (FOV) of the first image partially overlaps a FOV of the second image;

identify a non-overlap region for the first image, the non-overlap region being a region in the first image where the FOV of the second image does not overlap the FOV of the first image; and generate a depth map based on the stereo pair of images, said generating comprising:

for the overlap region, determine depths for a portion of the environment represented by the overlap region by performing stereo matching using the overlap region;

for the non-overlap region, determine depths for a portion of the environment represented by the non-overlap region by acquiring depth information from a source different from the stereo pair of images, wherein the source is a surface reconstruction mesh that was previously constructed from one or more previously generated depth maps that were fused together to generate the surface reconstruction mesh such that depth data from the surface reconstruction mesh is provided to fill in depths for the non-overlap region, and wherein an alignment is performed to ensure that a border between the overlap region and the non-overlapping region is aligned to avoid depth discontinuities that may exist between the depth data provided by the surface reconstruction mesh and the depths provided by the stereo matching.

* * * * *